US011247850B2

(12) United States Patent
Wilson et al.

(10) Patent No.: US 11,247,850 B2
(45) Date of Patent: Feb. 15, 2022

(54) DIVIDER SYSTEM

(71) Applicant: Morrison Timing Screw Co., Glenwood, IL (US)

(72) Inventors: Nick Lynn Wilson, Downers Grove, IL (US); Mark Burk, Highland, IN (US)

(73) Assignee: Morrison Timing Screw Co., Glenwood, IL (US)

( * ) Notice: Subject to any disclaimer, the term of this patent is extended or adjusted under 35 U.S.C. 154(b) by 0 days.

(21) Appl. No.: 16/859,451

(22) Filed: Apr. 27, 2020

(65) Prior Publication Data

US 2020/0255229 A1 Aug. 13, 2020

Related U.S. Application Data

(63) Continuation of application No. 16/059,604, filed on Aug. 9, 2018, now Pat. No. 10,633,196.

(60) Provisional application No. 62/543,503, filed on Aug. 10, 2017.

(51) Int. Cl.
*B65G 47/68* (2006.01)
*B65G 47/71* (2006.01)
*B65G 47/28* (2006.01)
*B65G 47/30* (2006.01)
*B65G 33/06* (2006.01)

(52) U.S. Cl.
CPC .......... *B65G 47/682* (2013.01); *B65G 33/06* (2013.01); *B65G 47/28* (2013.01); *B65G 47/30* (2013.01); *B65G 47/71* (2013.01); *B65G 2201/0244* (2013.01); *B65G 2812/0511* (2013.01); *B65G 2812/0577* (2013.01); *B65G 2814/0264* (2013.01)

(58) Field of Classification Search
CPC ...... B65G 47/682; B65G 33/06; B65G 47/28; B65G 47/30; B65G 47/71; B65G 2201/0244; B65G 2812/0511; B65G 2812/0577; B65G 2814/0264
USPC ........................................................ 198/793
See application file for complete search history.

(56) References Cited

U.S. PATENT DOCUMENTS

| | | | | |
|---|---|---|---|---|
| 2,857,037 A | * | 10/1958 | Breeback | B65G 47/681 198/436 |
| 3,827,211 A | * | 8/1974 | Zavatone | B65B 21/24 53/48.7 |
| 4,301,912 A | * | 11/1981 | Cooley | B65G 47/71 198/436 |
| 5,737,898 A | * | 4/1998 | Grimm | B65B 21/04 198/459.6 |

(Continued)

*Primary Examiner* — Gene O Crawford
*Assistant Examiner* — Lester Rushin, III
(74) *Attorney, Agent, or Firm* — Quinn IP Law

(57) ABSTRACT

A divider system for diverting objects from an infeed lane into one or more discharge lanes includes a dividing screw set, a discharge screw set, and a diverting mechanism. The dividing screw set conveys a sequence of objects to an output end of the screw set where the objects are divided by rotation of the dividing screw set and outputted alternately to first and second discharge screws of the discharge screw set to form a first series of objects conveyed by the first discharge screw and a second series of objects conveyed by the second discharge screw. The divider system includes a diverting mechanism which can be selectively actuated to divert objects from one discharge screw to the other discharge screw to form a diverted group.

20 Claims, 20 Drawing Sheets

(56) References Cited

U.S. PATENT DOCUMENTS 9,079,722 B2 * 7/2015 de Hertogh ............ B65G 33/02
9,321,597 B2 * 4/2016 Wilson .................. B65G 65/46

* cited by examiner

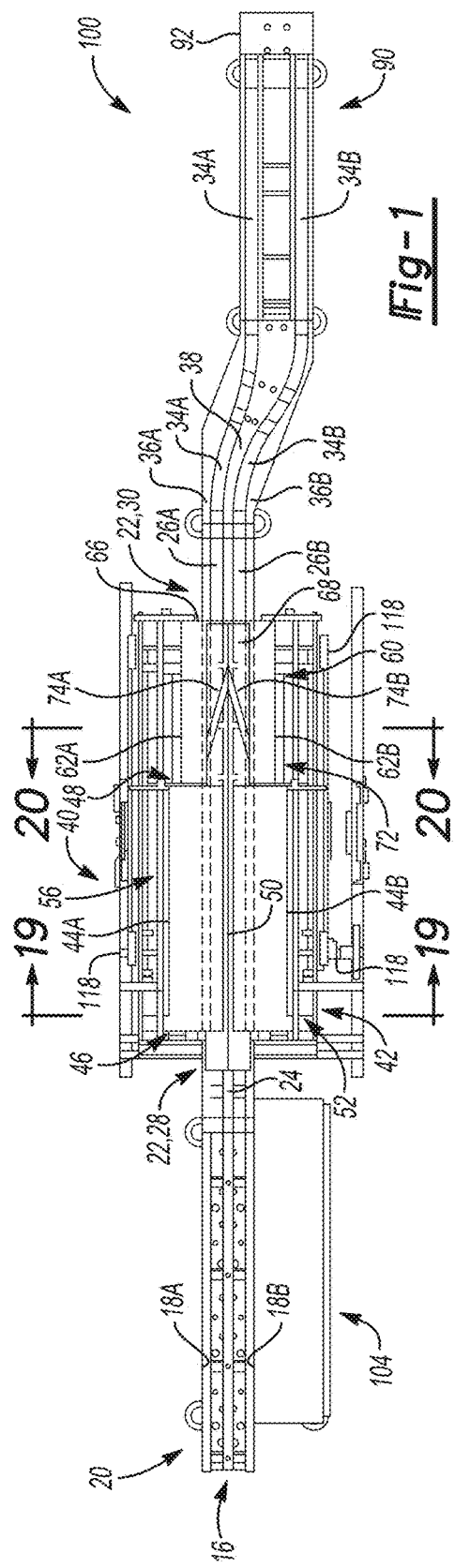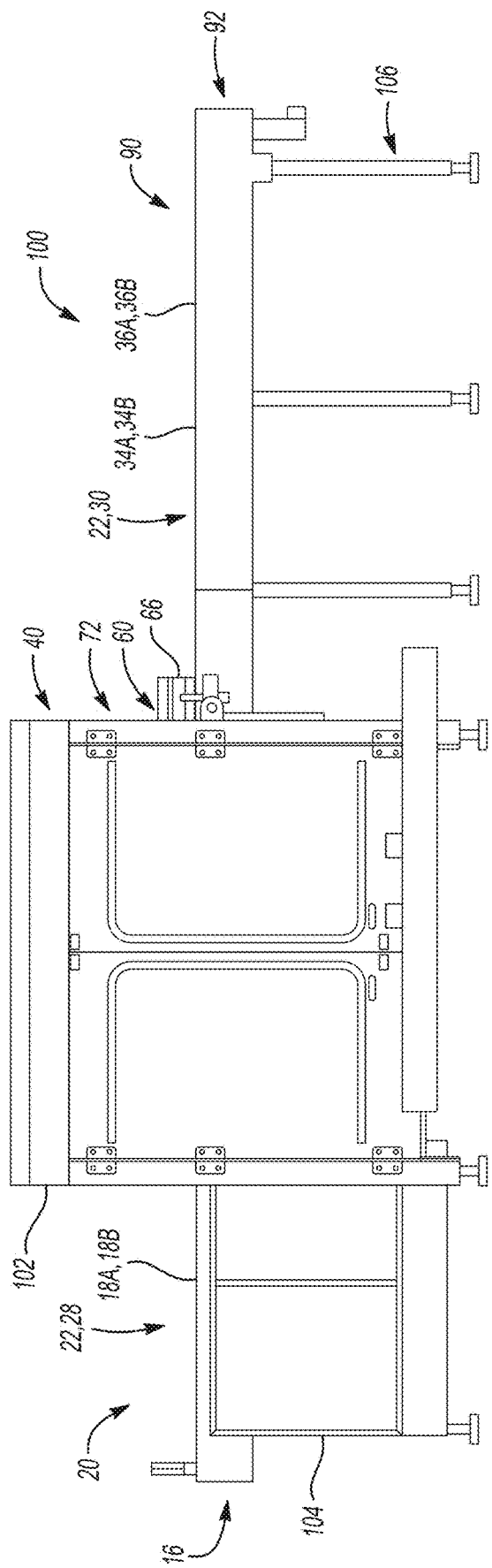

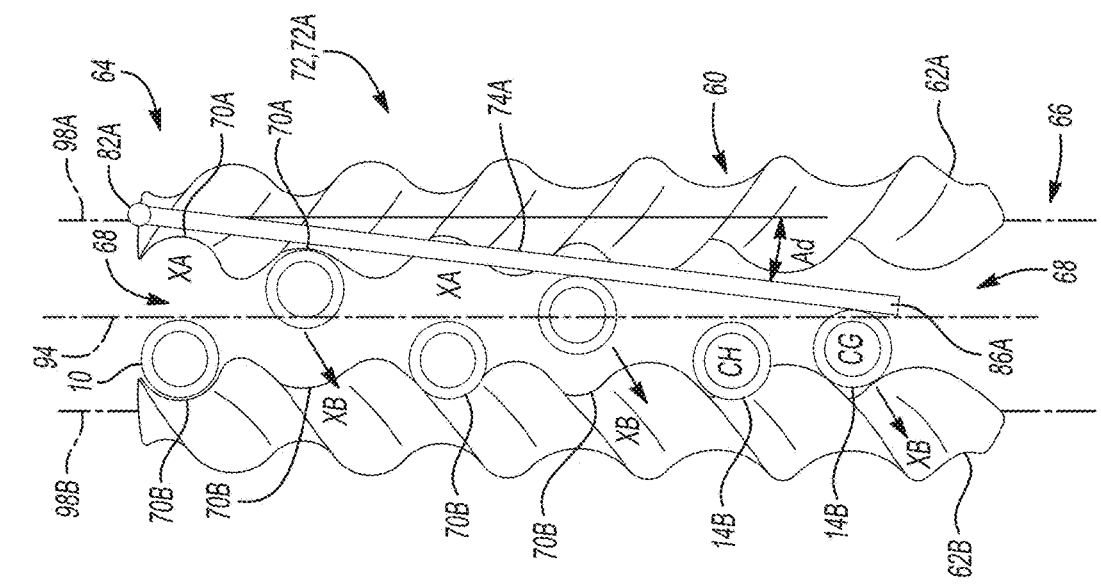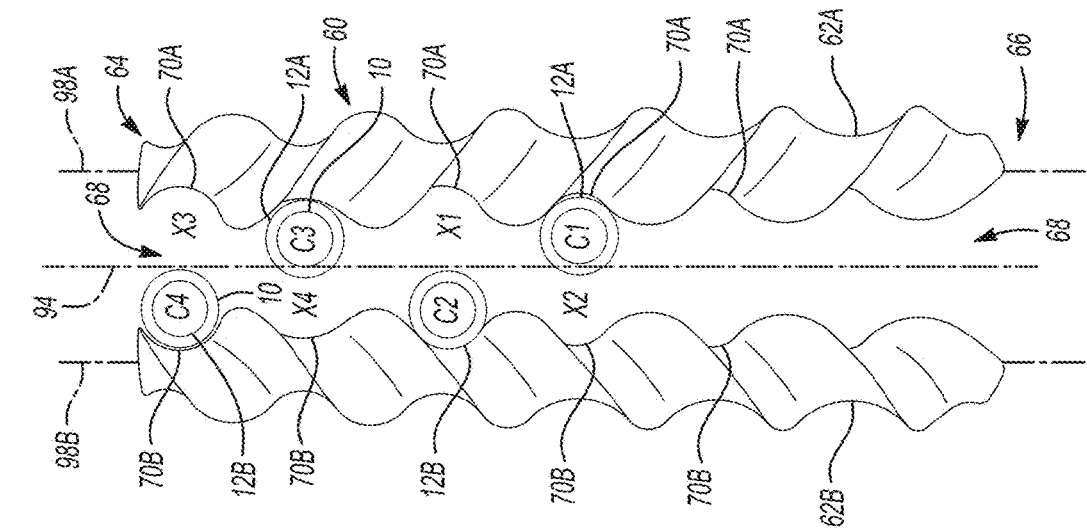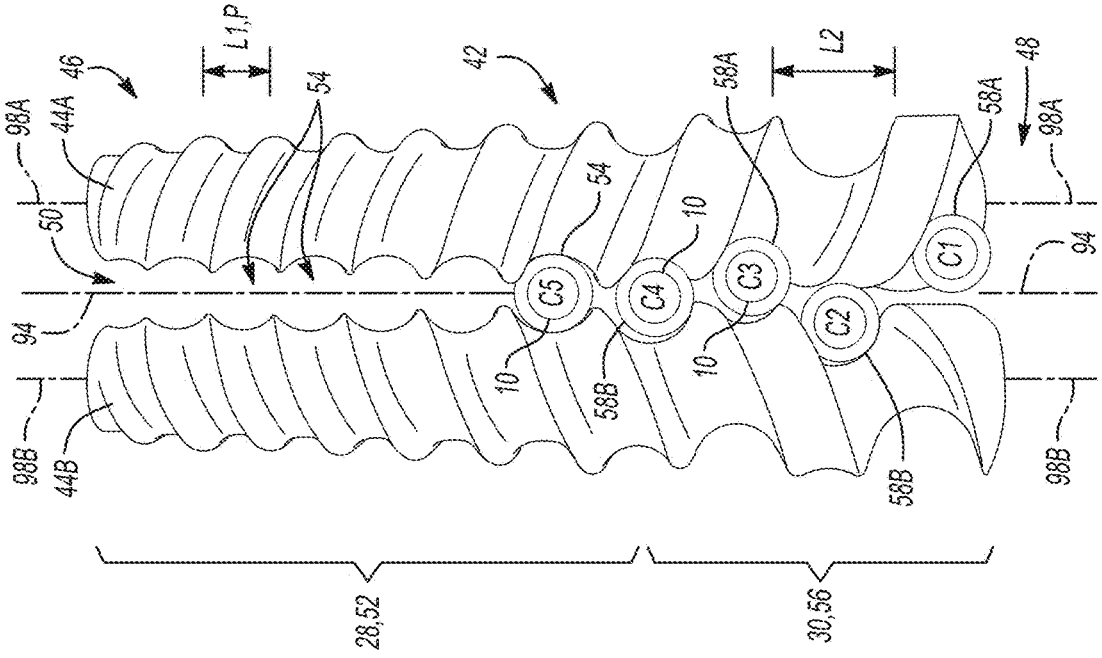

DIVIDER SYSTEM

CROSS-REFERENCE TO RELATED APPLICATION

This application claims priority to and the benefit of U.S. patent application Ser. No. 16/059,604 filed Aug. 9, 2018, and U.S. Provisional Patent Application No. 62/543,503, filed on Aug. 10, 2017, which are hereby incorporated by reference in their entirety.

TECHNICAL FIELD

The present disclosure relates to a divider system for dividing and diverting objects from an infeed lane into one or more discharge lanes.

BACKGROUND

Divider and diverting mechanisms are used in combination with conveyor mechanisms to convey objects received via an infeed such that the objects are divided between two or more discharge lanes and/or diverted to a selected one of the discharge lanes as required by the system including the divider, for example, to discharge the divided and/or diverted objects to one or more downstream processes, to balance the volume of objects fed to each of multiple downstream processes, to separate the objects by type and/or condition, etc. Divider systems which use a dividing force such as an air blast or mechanical force, such as a plunger force, to force an object on a conveyor to one side of the conveyor or the other to divide a sequence of conveyed objects between two discharge conveyors are known. The use of an air blast or plunger force to exert a dividing force on the object, especially taller and/or lightweight objects, can be destabilizing, potentially causing the object to tip or fall from the conveyor, which can result in a disruption of the conveyor operation. The dividing force in these systems may be triggered from an input signal received from a sensor, such as an electronic eye, which is configured to detect an objection condition. Delay associated with detection and transmission of the detection signal, additional delay associated with actuation delay of an air blast or plunger actuator, and/or variability in response time and/or dividing force associated with variability in pressure of the air blast due to environmental factors including temperature, humidity, etc., introduces variation into the response time and accuracy of such a dividing system. Changeover of such a divider system may require additional time for reprogramming of sensor eyes and pneumatic controls, air nozzle size, type and/or position adjustment, etc., for each different size, shape and/or weight of the object.

SUMMARY

A divider system for dividing and selectively diverting objects from an infeed lane into one or more discharge lanes is provided. The divider system described herein includes a dividing screw set, a discharge screw set, a diverting mechanism, and a conveying mechanism for conveying a sequence of objects received to the divider system from an infeed lane through the dividing and discharge screw sets to one or more discharge lanes. The divider system receives objects from an infeed channel for division into first and second series of objects by the dividing screw set. The first series of objects is output to a first discharge screw of the discharge screw set and onto a first discharge belt, and conveyed by the first discharge screw through a discharge channel defined by the discharge screw set. The second series of objects is output to a second discharge screw of the discharge screw set and onto a second discharge belt, and conveyed by the second discharge screw through the discharge channel.

The dividing screw set has an input end for receiving objects from an infeed lane, and an output end for outputting the objects in divided series into a discharge channel defined by the discharge screw set. The dividing screw set has an infeed portion and a dividing portion, where the lead of the screw form in the dividing portion is greater than the lead of the infeed portion. The infeed portion includes a plurality of infeed pockets for sequencing, stabilizing and conveying objects received from the infeed lane to the dividing portion on a conveyor including split and tilted first and second discharge belts, such that, when a sequence of objects are conveyed into the dividing portion, alternating objects in the sequence are tilted into the dividing pockets of the first and second dividing screws, such that a first object in the sequence is divided and tilted into a dividing pocket of the first dividing screw, the second object in the sequence is divided and tilted into a dividing pocket of the second dividing screw, a third object in the sequence is divided and tilted into a dividing pocket of the first dividing screw, a fourth object in the sequence is divided and tiled into a dividing pocket of the second dividing screw, and so on in alternating fashion, to divide the sequence of objects into a first series of objects divided into the dividing pockets of the first dividing screw which are outputted from the first dividing screw onto the first discharge belt to be received into alternating discharge pockets of the first discharge screw, and a second series of objects divided into the dividing pockets of the second dividing screw which are outputted from the second dividing screw onto the second discharge belt to be received into alternating discharge pockets of the second discharge screw.

As an object of the first series is outputted from the dividing pocket of the first dividing screw onto the first discharge belt, the divided object is received into a discharge pocket of a first discharge screw, for conveyance to a first discharge lane. Similarly, as an object of the second series is outputted from the dividing pocket of the second dividing screw, the divided object is received into a discharge pocket of a second discharge screw, for conveyance to a second discharge lane. The diverting mechanism is actuable to selectively divert one or more objects from the discharge pockets of one of the discharge screws into empty discharge pockets of the other of the discharge screws, to form a diverted group of objects which are conveyed to a selected one of the discharge lanes. In an illustrative configuration, the diverting mechanism includes diverter elements which can be actuated, for example, by one of a servo, hydraulic, pneumatic, or magnetic actuator, to contact and divert the object from one discharge belt to the other. In one example, the diverter element is configured as a pivoting arm, which can include a contact surface which is contoured to gradually contact the objects being diverted, so as to gradually apply a diverting force to the objects without destabilizing the objects. Movement and actuation of the diverter elements, the dividing screws, the discharge screws, and the conveyor is controlled by a controller. Advantageously, the pockets defined by the dividing screw set and the discharge screw set stabilize and support the objects as the objects are conveyed, divided, diverted and/or discharged. The system is further advantaged by coordination of the rotation speed of the dividing and discharge screws with the belt speed of the conveyor by a controller, where the rotation speed and the belt speed are coordinated so no loading force (no drag or acceleration) is imposed by the conveyor on the objects being conveyed through the divider system, such that each of the objects is conveyed in a stable and controlled position through the divider system. Advantageously, the support provided by the screw sets enables dividing and diverting of relatively taller and/or lighter objects such as empty containers, while minimizing and/or eliminating potential for object tip over or jamming in the system.

The divider system can include one or more sensors for sensing a condition and/or state of the object, such as a color, shape, label, bar code, weight, component presence, size, etc. and for outputting a sensor signal indicating the condition and/or state of the object to the controller. The controller is configured to receive and analyze the sensor signal and to selectively divert one or more objects from one of the discharge belts to the other in response to the sensor signal. The controller can be configured to receive input signals from other devices and/or sensors, which may be upstream and/or downstream of the divider system, including signals indicating object flow and line balancing information from downstream processes receiving the divided objects from the discharge lanes of the divider system. The controller can use the input signals to selectively divert one or more objects from one of the discharge belts to the other in response to the input signal. A method for dividing and diverting objects using the divider system described herein is provided.

The use of screw sets to divide and convey the divided objects, and the use of mechanical diverters to divert divided objects into a diverted group, as described in detail herein, while stabilizing those objects using a discharge screw set, provides a divider system which can divide and divert objects at high speeds and with high accuracy of position on the conveyor, uniform spacing, and position stability, as compared with known systems which first sense an object presence and/or condition, transmit a signal, and actuate a burst of air or plunger to divert an unsupported object on a conveyor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic top view of a divider system for selectively feeding objects from an infeed lane into one or more discharge lanes, the divider system including a conveying mechanism, a dividing mechanism including a dividing screw set and a discharge screw set, and a diverting mechanism;

FIG. 2 is a schematic plan view of the divider system of FIG. 1;

FIG. 16 is schematic top view of the dividing screw set of the divider system of FIG. 1;

FIG. 17 is a schematic top view of the discharge screw set of the divider system of FIG. 1;

FIG. 18 is a schematic top view of the discharge screw set of FIG. 17 including a diverter;

FIGS. 21 through 24 showing the sequence of objects being divided into two series of objects by the dividing screw set, where each series of objects is discharged from the dividing screw set onto a respective discharge belt and conveyed by the discharge screw set to a respective discharge lane;

FIG. 25 showing actuation of one of the diverters of the diverting mechanism to divert the divided series of objects in the discharge screw set into one of the discharge lanes to form a diverted group of objects; and FIG. 26 showing de-actuation of the diverting mechanism to cease diversion of the divided series of objects into the diverted group; and FIG. 27 showing actuation of the other diverter of the diverting mechanism to divert the divided series of objects in the discharge screw set into the other of the discharge lanes to form a diverted group of objects.

DETAILED DESCRIPTION

Figure 20:
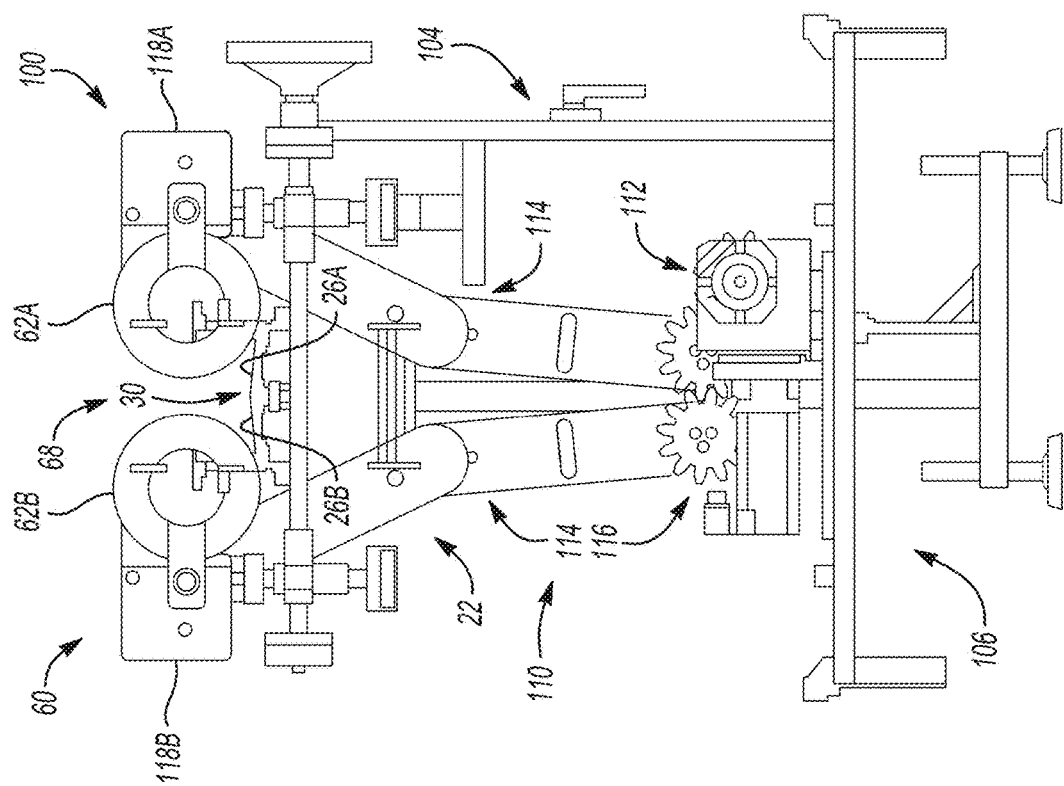
FIG. 20 is a schematic cross-sectional view of section 20-20 of FIG. 1.
Figure 19:
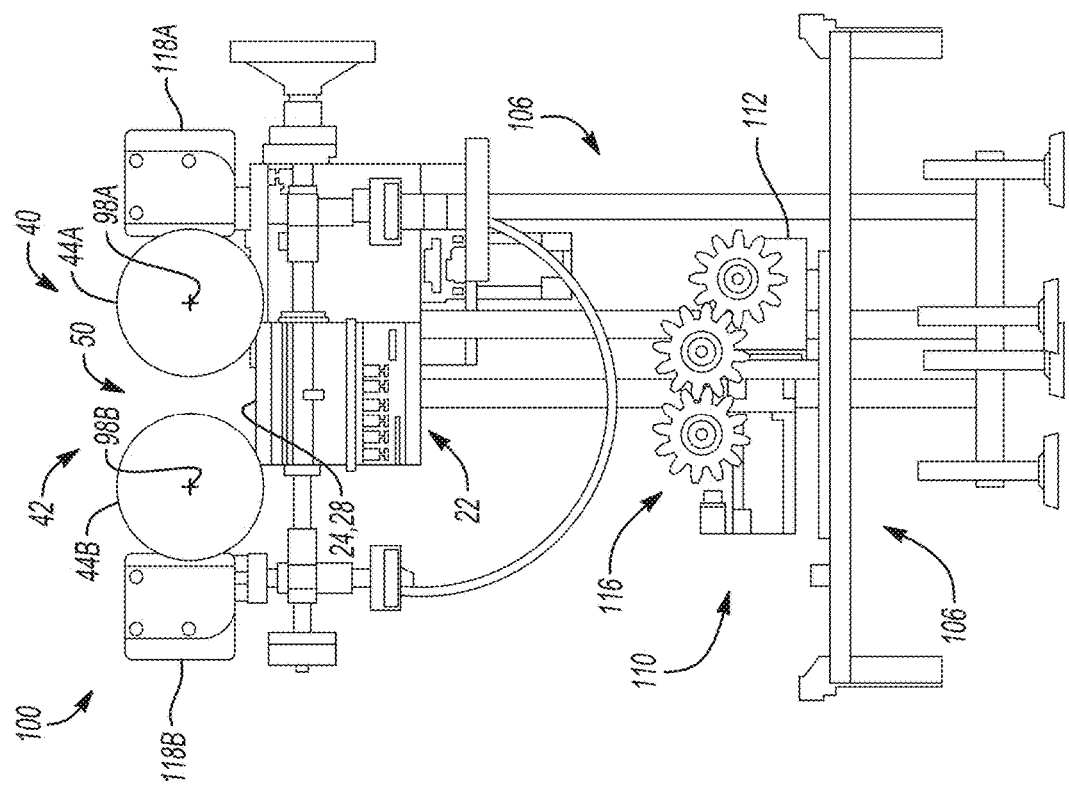
FIG. 19 is a schematic cross-sectional view of section 19-19 of FIG. 1.
Figure 21:
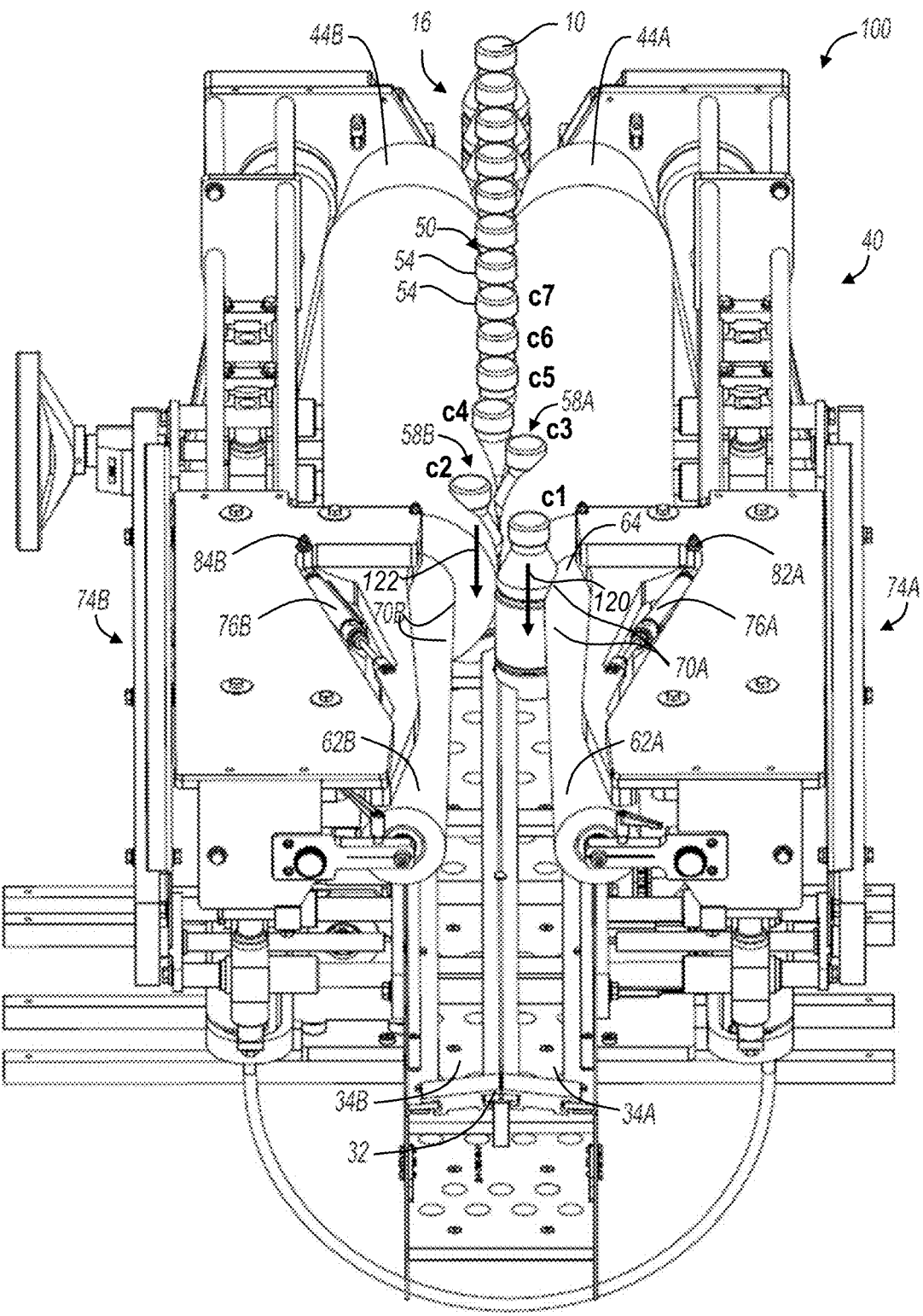
FIGS. 21 through 27 are a series of photographic images showing a series of objects conveyed by the divider system of FIG. 1, including.

Referring to the drawings wherein like reference numbers represent like components throughout the several figures, the elements shown in FIGS. 1-27 are not necessarily to scale or proportion. Accordingly, the particular dimensions and applications provided in the drawings presented herein are not to be considered limiting. Referring to FIGS. 1-5, a divider system is indicated generally at 100, and includes a conveying mechanism indicated generally at 20, a dividing mechanism indicated generally at 40, a diverting mechanism generally indicated at 72, a drive mechanism indicated generally at 110 (see FIGS. 19-20) and a controller 104. The divider system 100 includes a frame assembly 106 to which the conveying mechanism 20, the dividing mechanism 40, the diverting mechanism 72, the drive mechanism 110 and the controller 104 are attached. The divider system 100 can be at least partially contained by a housing 102, as shown in FIG. 2.

The conveying mechanism 20 includes a conveyor generally indicated at 22 and driven by the drive mechanism 110. The conveyor 22 includes an infeed belt 24 for conveying a sequence of objects 10 along an infeed lane 16 between infeed rails 18A, 18B to discharge belts 26A, 26B of the conveyor 22. The discharge belts 26A, 26B include a flat portion 28 (see FIG. 9) to receive the objects 10 from the infeed belt 24, and a peaked portion 30 (see FIGS. 10-12) for conveying the objects through the dividing mechanism 100. In the peaked portion, the discharge belts 26A, 26B are tilted away and downward from a peaked center 32 and away from a longitudinal axis 94 of the conveyor 22. The discharge belts 26A, 26B convey the sequence of objects 10 through the dividing mechanism 40 where the objects 10 are divided into two object series 12A, 12B, where, in the example shown in FIGS. 3-12 and as described in further detail herein, the objects 10 in the first series 12A are divided onto a first discharge belt 26A and the objects 10 in the second series 12B are divided onto a second discharge belt 26B. The object series 12A, 12B are conveyed, respectively, on discharge belts 26A, 26B to, respectively, discharge lanes 34A, 34B of an outfeed portion 90 to exit the conveyor 22 at an outfeed end 92. In the example shown in FIG. 1, the discharge lanes 34A, 34B are defined by discharge rails 36A, 36B and a lane separator 38. The divider system 100 further includes a diverting mechanism 72 which, in the example shown in FIGS. 1 and 13-15 and as explained in further detail herein, can be selectively actuated to divert the series 12A, 12B of the divided objects 10 onto one of the discharge belts 26A, 26B to form a diverted group 14 of objects 10, where the diverted group 14 of objects 10 are then conveyed via a respective one of the discharge lanes 34A, 34B to the outfeed end 92 of the conveyor 20.

Figure 3:
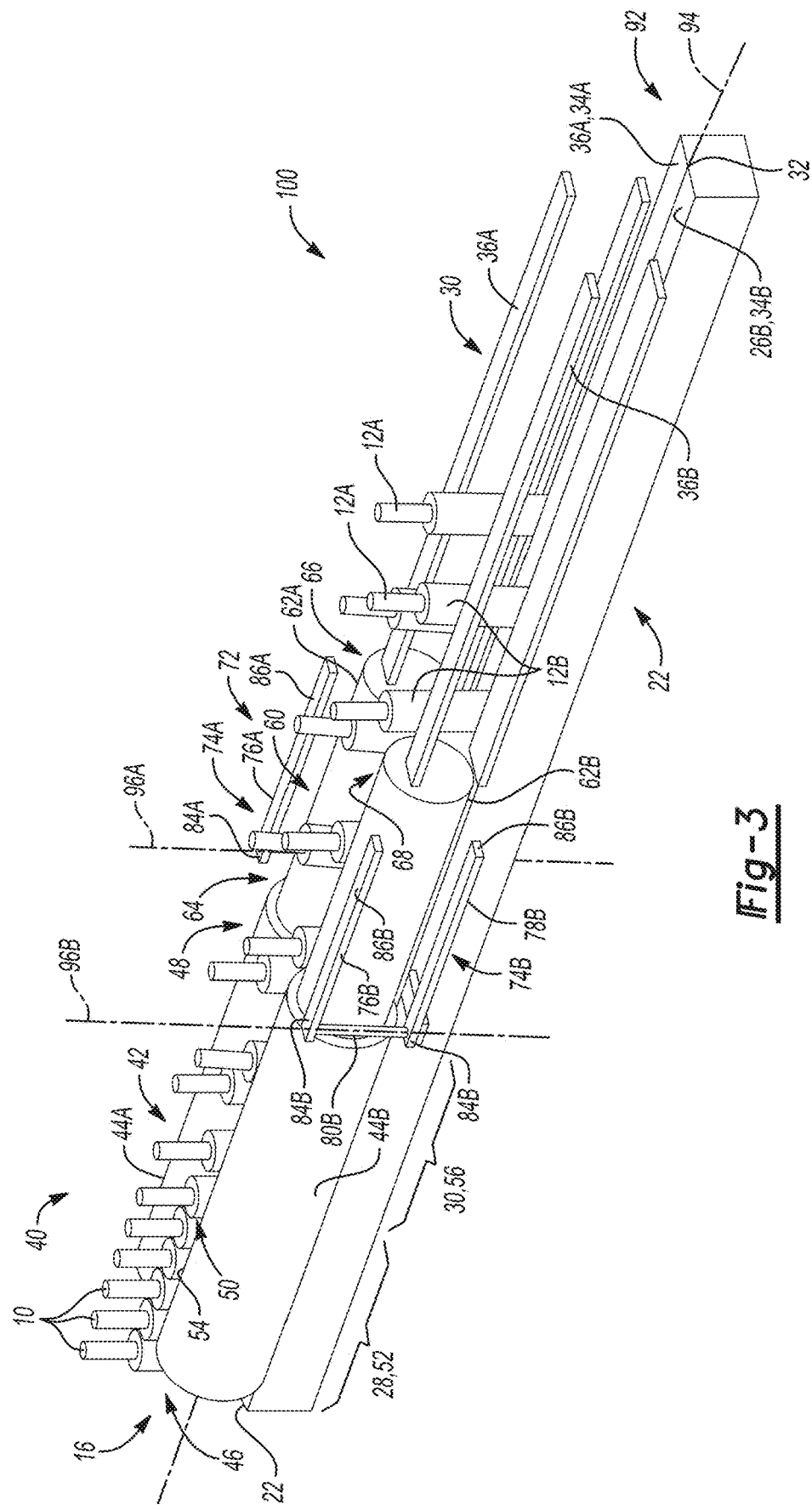
FIG. 3 is a schematic perspective illustration of the divider system, showing a sequence of objects being divided by the dividing screw set into two series of objects and outputted to the discharge screw set for discharge in two discharge lanes.
Figure 4:
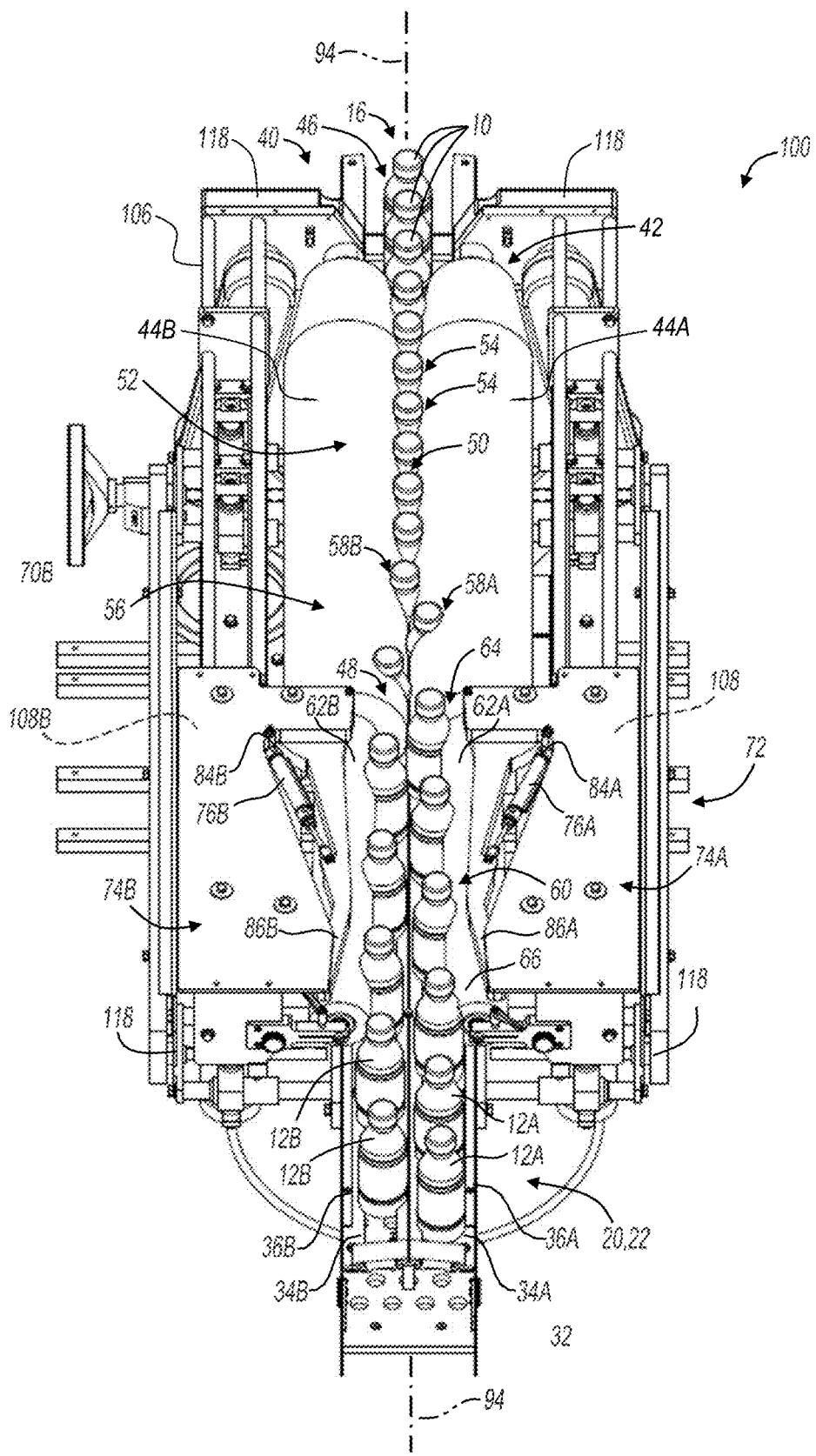
FIG. 4 is a photographic image of a perspective top view of the divider system of FIG. 3.
Figure 5:
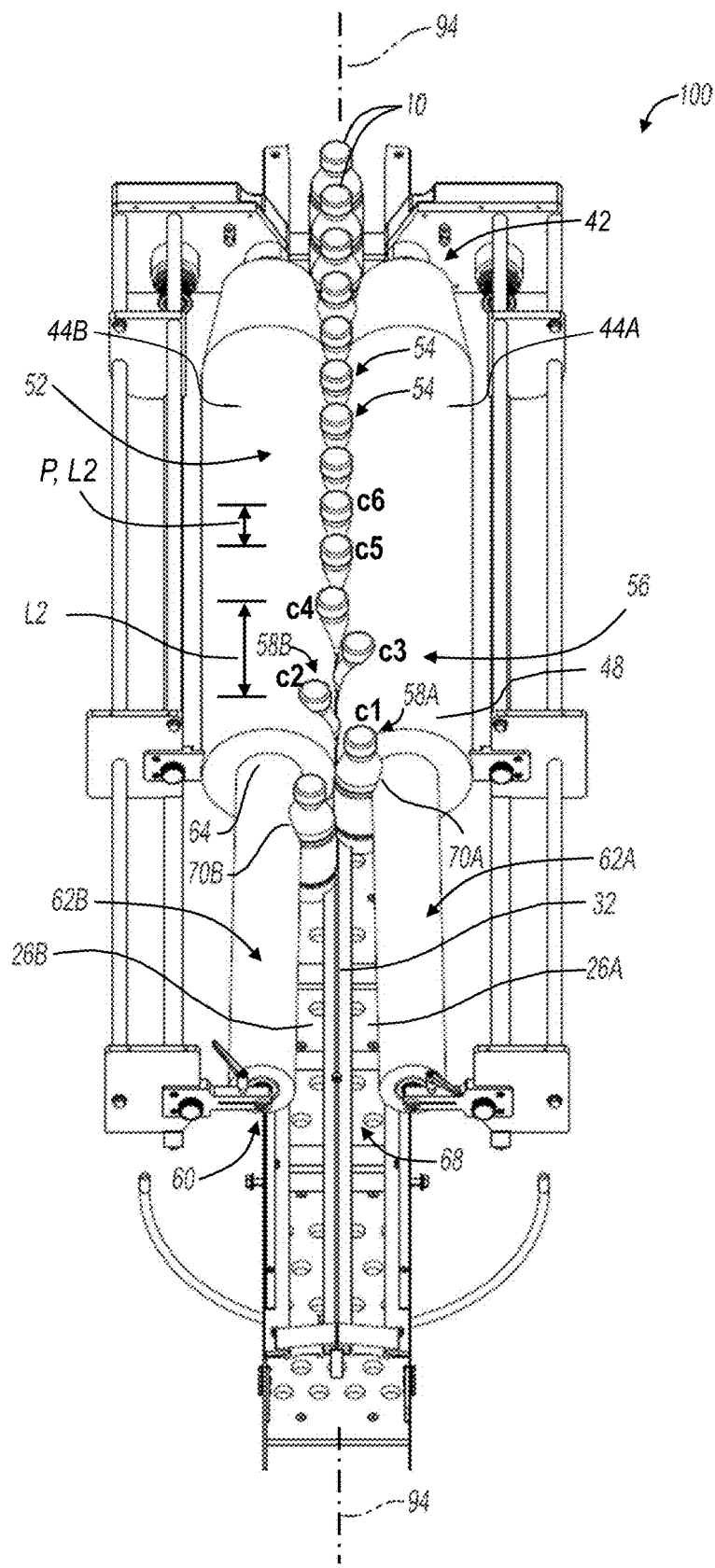
FIGS. 5 through 7 are photographic images of the divider system, illustrating a sequence of objects being divided by the dividing screw set into two series of objects, each series of objects being conveyed on a respective discharge belt by a respective discharge screw.

Referring to FIGS. 3-12 and FIG. 16, the dividing mechanism 40 includes a dividing screw set indicated generally at 42, and a discharge screw set indicated generally at 60. The dividing screw set 42 includes first and second dividing screws 44A, 44B connected to drive units 118A, 118B such that each of the dividing screws 44A, 44B is rotatable about a screw axis 98 (see FIG. 9). The dividing screw set 42 includes an input end 46 for receiving objects 10 from the infeed belt 24, and an output end 48 for outputting the divided objects 10 in two object series 12A, 12B. As shown in FIGS. 3 and 4, object series 12A is outputted to discharge belt 26A for conveyance to discharge lane 34A, and object series 12B is outputted to discharge belt 26B for conveyance to discharge lane 34B. The dividing screws 44A, 44B are configured to be driven by drive units 118 in opposing directions relative to a longitudinal axis 94 defined by the conveyor 22. In the present example, dividing screw 44A is configured to rotate clockwise, and dividing screw 44B is configured to rotate counter-clockwise, as viewed from the output end 48 of the dividing screw set 42. As shown in FIGS. 5 and 16, each of the dividing screws 44A, 44B is a variable lead screw, having an infeed portion 52 with a thread form having a first lead L1, and a dividing portion 56 with a thread form having a second lead L2, where the second lead L2 is greater (longer) than the first lead L1. The second lead L2 defines a predetermined interval at which objects 10 are outputted from the output end 48 of the dividing screw set 42. In a non-limiting example, the first lead L1 is equal to the pitch P of the screw thread form, and the second lead L2 is twice the pitch P of the screw thread form.

Figure 8:
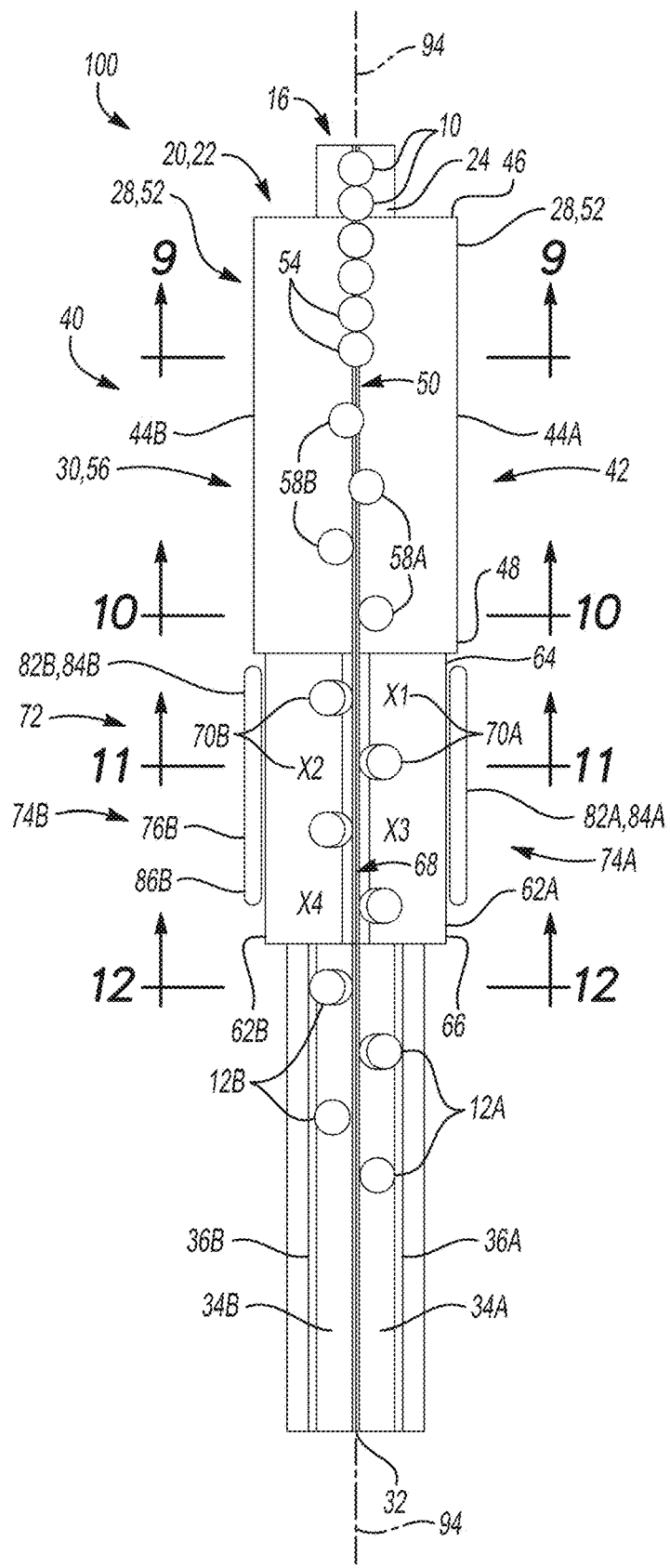
FIG. 8 is a schematic top view of the divider system of FIG. 3.
Figure 9:
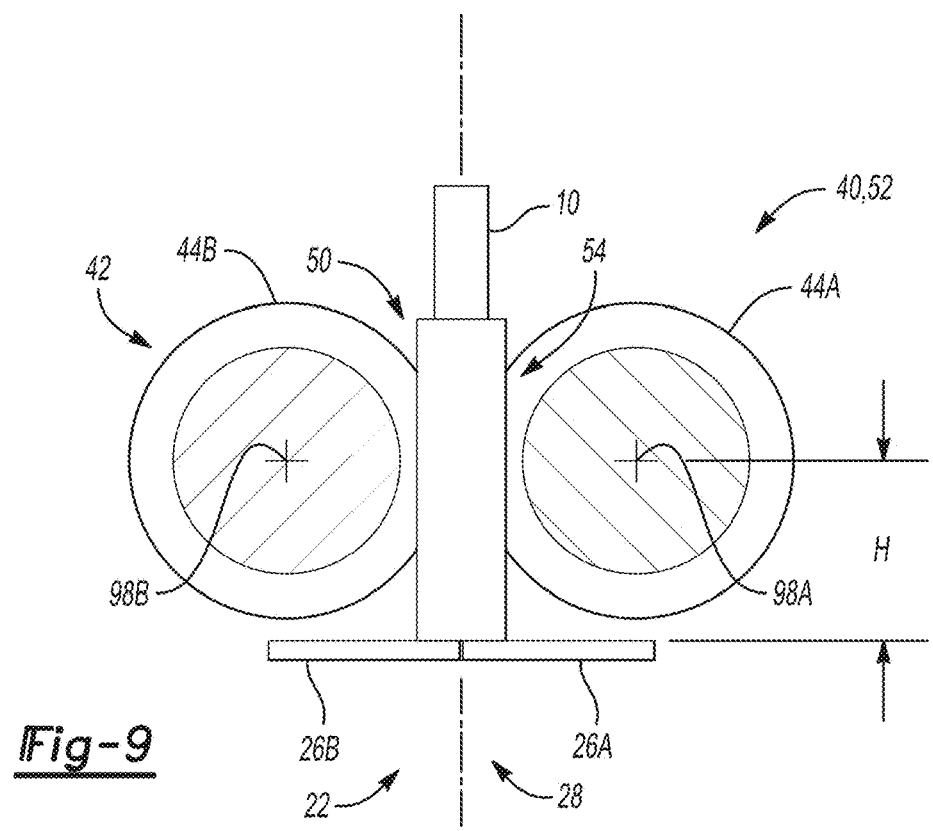
FIG. 9 is a schematic view of section 9-9 of the divider system of FIG. 8, showing a object being conveyed in an infeed portion of the dividing screw set.

As shown in FIGS. 5, 8 and 16, the dividing screws 44A, 44B are aligned such that the screw axes 98 of the dividing screws 44A, 44B are parallel to each other and to the longitudinal axis 94, and are spaced laterally from the longitudinal axis 94 and relative to each other to define a dividing channel 50 including a plurality of infeed pockets 54 distributed along the longitudinal length of the infeed portion 52 of the dividing screw set 42, and a plurality of dividing pockets 58A, 58B distributed along the longitudinal length of the dividing portion 56 of the dividing screw set 42. The shape of each infeed pocket 54 is defined by the screw form of the infeed portion 52 of the dividing screws 44A, 44B. As shown in FIGS. 5, 9 and 16, in the infeed portion 52, the thread forms of the dividing screws 44A, 44B are aligned to form the plurality of infeed pockets 54, such that each object 10 in the infeed portion is supported in a substantially upright position in a respective infeed pocket 54, as shown in FIGS. 3, 9 and 16, as the object 10 is conveyed through the infeed portion 52 from the input end 46 to the dividing portion 56 along a flat portion 28 of the conveyor 22. In a non-limiting example, the height H of the dividing screws 44A, 44B can be adjusted for the height, shape, size, and/or weight distribution of the object 10, to stabilize the object 10 in the upright position and as such, prevent tipping of the object 10, jamming of the object 10 in the dividing channel 50, etc. It would be understood that the divider system 100 can include multiple sets of dividing screws 44A, 44B, each set 42 having a different thread form, lead combination, number of starts, pocket size, etc., for use with objects 10 of different shapes and sizes.

As shown in FIGS. 5, 8, 10, and 16, in the dividing portion 52, the thread forms of the dividing screws 44A, 44B are offset to form a plurality of dividing pockets 58A, 58B which are longitudinally offset from each other, such that, due to the offset formation of the dividing pockets 58A, 58B and the larger lead L2 of the thread form in the dividing portion 56, the objects 10 in the dividing portion 56 are spaced along the longitudinal axis 94 of the dividing channel 50 and singulated from each other prior to being outputted from the output end 48 of the dividing screw set 42. As shown in FIGS. 8 and 10-12, the conveyor 22, in the dividing portion 56 of the dividing channel 58 and continuing through the discharge channel 68, is peaked such that each of the discharge belts 26A, 26B is tilted away and downward (as viewed on the page) from a central peak at a peak angle Ap. An object 10 in the dividing portion 56 will be tilted into one or the other of the dividing pockets 58A, 58B as the object 10 is conveyed into the dividing portion 56, by the action of the dividing portion 56 of the one of the dividing screws 44A, 44B including the dividing pocket 58a, 58B into which the object 10 is received, in combination with the tilting action of the peaked discharge belts 26A, 26B urging the object 10 to tilt into the dividing pocket 58A, 58B. The photographic images shown in FIGS. 5-7 and schematic FIGS. 8-12 illustrate the progression of a sequence of objects 10 being divided by rotation of the dividing screw set 42 into two object series 12A, 12B and outputted into the discharge screw set 60 while being conveyed on the peaked portion 30 of discharge belts 26A, 26B of conveyor 22.

Referring now to FIG. 5, shown is a sequence of objects 10, which in the non-limiting example are containers sequentially labeled c1, c2, c3, c4, c5, c6, c6 for illustrative purposes. The objects 10 have been received into the infeed portion 52 and conveyed sequentially through the dividing screw set 42 such that at the point in time shown in FIG. 5, objects c1 and c2 are located in the dividing portion 56, object c3 is transitioning from an infeed pocket 54 of the infeed portion 52 to a dividing pocket 58A of the dividing portion 56, and objects c4, c5, c6 are located in infeed pockets 54. The conveyor 22 (see FIGS. 8 and 9) in the infeed portion 52 includes a flat portion 28 such that the discharge belts 26A, 26B in the infeed portion 52 are flat and such that the objects c4, c5, c6 are supported in an upright position by the dividing screws 44A, 44B on the flat portion 28, as shown in FIG. 9.

The conveyor 22 transitions from a flat portion 28 in the infeed portion 52 to a peaked portion 30 in the dividing portion 56 of the dividing mechanism, where in the dividing portion 56 each of the discharge belts 26A, 26B is peaked at a peak angle Ap (see FIGS. 8 and 10), such that, as object c3 transitions into dividing pocket 58A, object c3 is tilted away from its upright position into the dividing pocket 58A at a tilt angle At. The tilt angle At is a function of the peak angle Ap and the shape of the screw form and/or pocket depth in the dividing portion 56 of the dividing screw 44A, 44B. The tilt angle At can be increased by changing the shape of the dividing pocket 58, for example, by increasing the depth of dividing pocket 58 in the dividing portion 56. The tilt angle At can be affected by the shape, height, and center of gravity of the object 10. In one example, the height H of the dividing screws 44A, 44B relative to the discharge belts 26A, 26B can be adjustable, such that the height H of the dividing screws 44A, 44B can be modified to adjust the tile angle At. As such, it would be understood that one or more of the shape (pitch, lead, pocket depth, etc.) of the divider screws 44A, 44B, the peak angle Ap of the discharge belts 26A, 26B, and the screw height H can be varied to establish the tilt angle At of the object 10 in the dividing pocket 58, as the object 10 is progressed through the dividing portion 56, to ensure the object 10 is stabilized in the respective one of the dividing pockets 58A, 58B and on the respective one of the discharge belts 26A, 26B to which the object 10 is divided, as it is conveyed along the conveyor 22.

Figure 6:
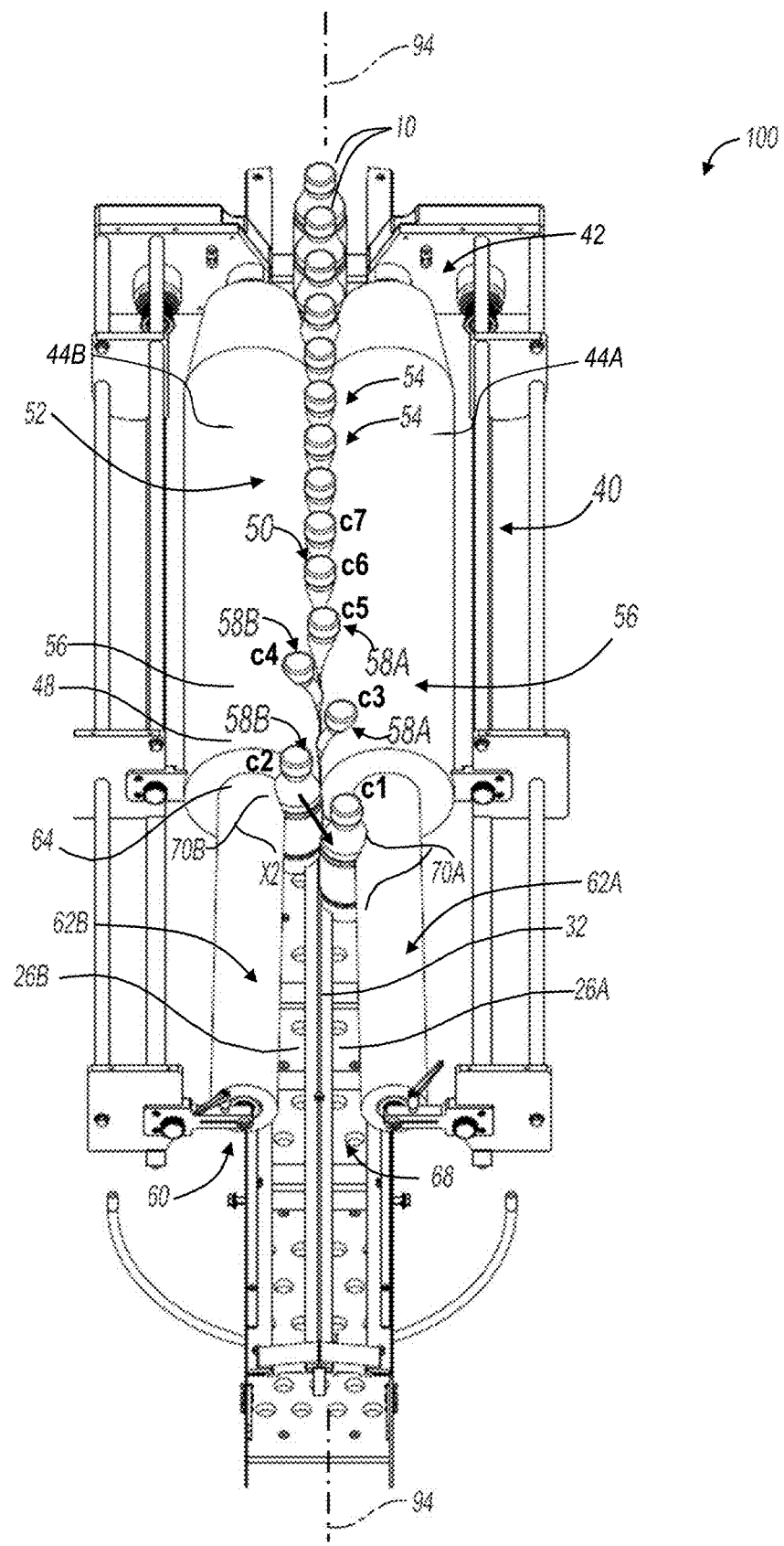
Figure 7:
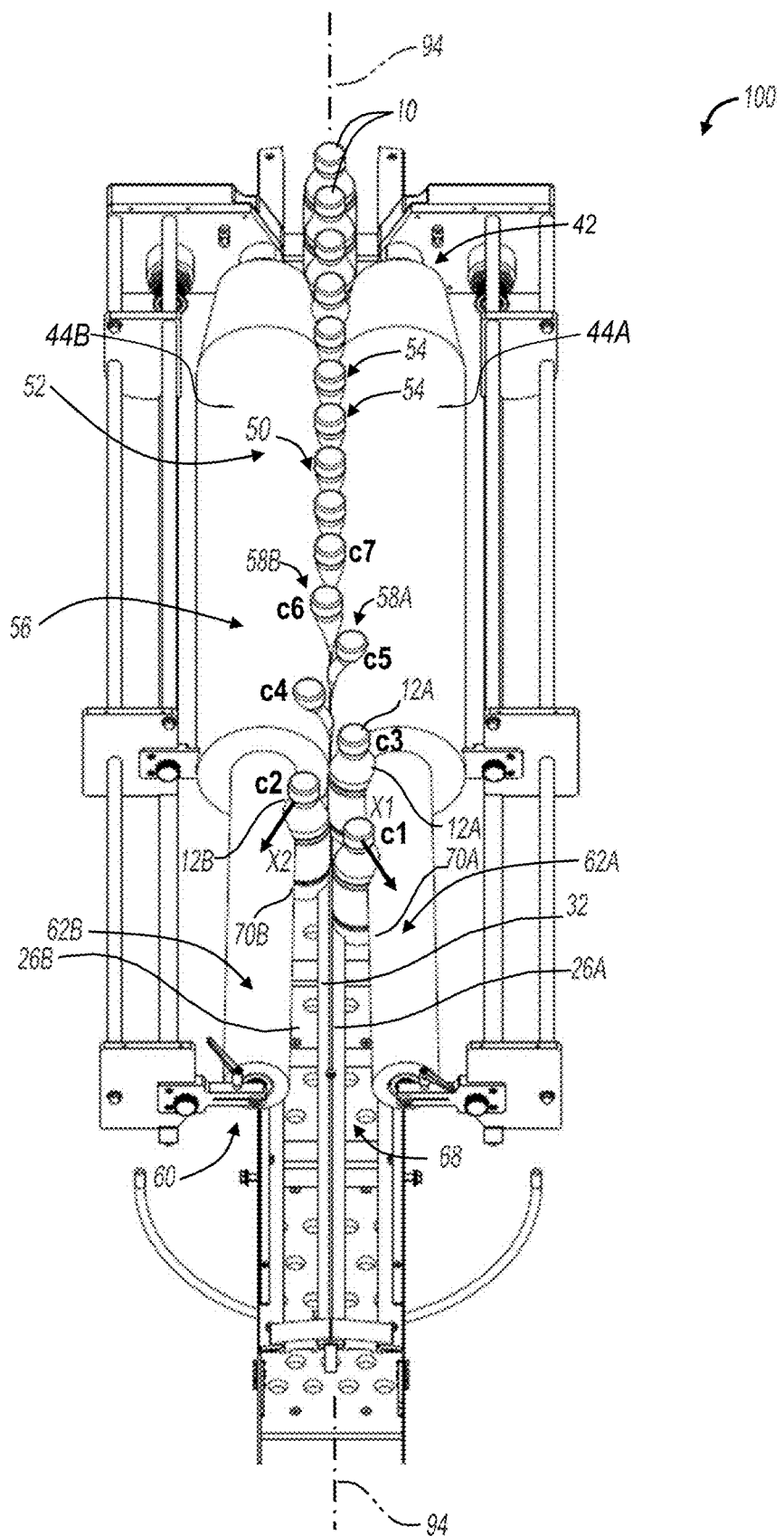
Figure 10:
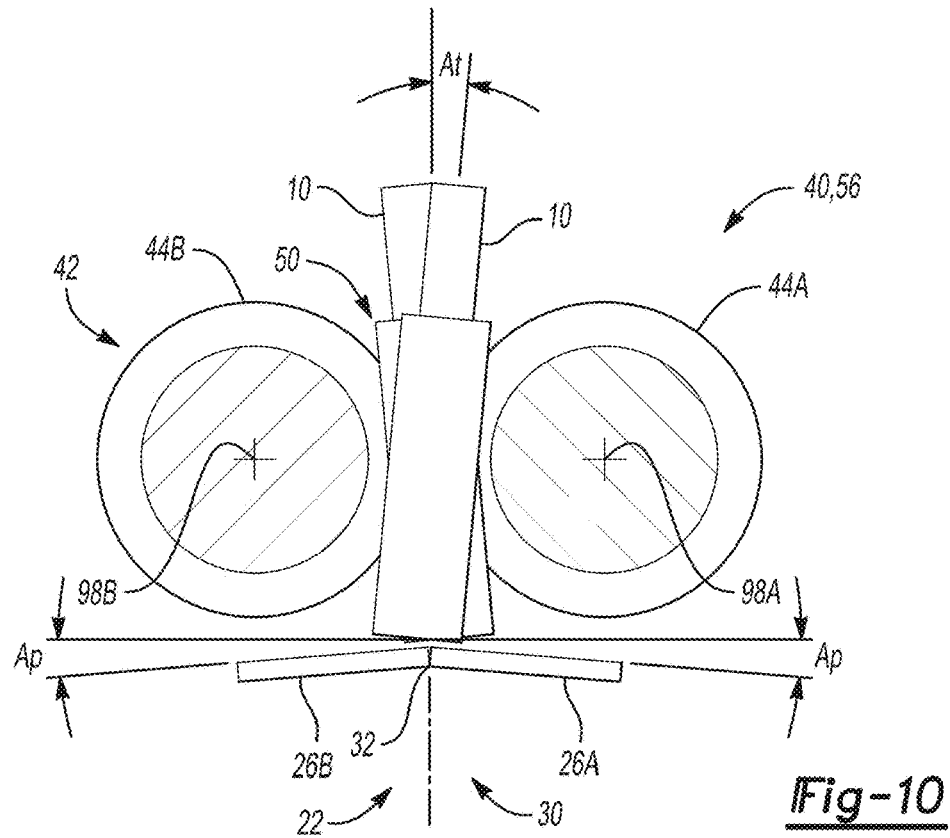
FIG. 10 is a schematic view of section 10-10 of the divider system of FIG. 8, showing objects being divided in a dividing portion of the dividing screw set.

As shown in FIGS. 5 and 16, and as illustrated in FIG. 10, dividing pockets 58A, 58B are longitudinally offset from each other, such that, as the sequence c1, c2, etc. of objects 10 is conveyed from the infeed portion 52 to the dividing portion 56 of the dividing screw set 42, the objects 10 are alternately divided between the first and second dividing screws 44A, 44B and first and second discharge belts 26A, 26B, such that every object 10 in the sequence is divided in a lateral direction which is opposite the previous and the subsequent objects 10 in the sequence. Referring to the sequence of objects 10 shown in FIGS. 5, 6, 17, and 21-22, object c1 is divided onto discharge belt 26A and into dividing pocket 58A of dividing screw 44A, and the next sequential object c2 is divided onto discharge belt 26B and into dividing pocket 58B of dividing screw 44B. This dividing pattern continues as the sequence of objects 10 progresses through the dividing screw set 42, as illustrated in FIGS. 6 and 7, with object c3 being divided onto discharge belt 26A and into dividing pocket 58A, and object c4 being divided onto discharge belt 26B and into dividing pocket 58B, and as further illustrated in FIGS. 23-24, showing the division of the object sequence c1, c2, c3, c4, c5, c6, c7, c8 into two object series 12A, 12B, where the first object series 12A includes objects c1, c3, c5, c7 (and so on) and is divided into dividing pockets 58A and onto discharge belt 26A, and the second object series 12B includes objects c2, c4, c6, c8 (and so on) and is divided into dividing pockets 58B and onto discharge belt 26B. As such, it would be understood that the division of the sequence c1, c2, c3, etc. of objects 10 into two object series 12A, 12B occurs by rotation of the dividing screw set 42 and lateral tilting of the object 10 on the conveyor 22 such that an object 10 in the sequence is singulated into one of the dividing pockets 58A, 58B and onto one of the discharge belts 26A, 26B, and the objects 10 which precede and are subsequent to that object 10 in the sequence are singulated into the other one of the dividing pockets 58B, 58A and onto the other one of the discharge belts 26B, 26A.

As shown in FIGS. 5 through 7 and further illustrated in FIGS. 21 through 24, the objects 10 in each of the object series 12A, 12B are outputted from the dividing screw set 42 to a receiving end 64 of the discharge screw set 60. As shown in the figures, objects 10 in the sequence of objects c1 . . . cn are divided by rotation of the dividing screw set 42 and received alternately into a dividing pocket 58A and a dividing pocket 58B, where the divided objects 10 received into the dividing pocket 58A are outputted at the output end 48 from the dividing pocket 58A and received by the discharge screw 62A to form a series of objects 12A, and the divided objects 10 received into the dividing pocket 58B are outputted at the output end 48 from the dividing pocket 58B and received by the discharge screw 62B to form a series of objects 12B. The discharge screw set 60 includes first and second discharge screws 62A, 62B connected to a drive unit 118 such that each of the discharge screws 62A, 62B is rotatable about a screw axis 98 (see FIG. 11) to define a longitudinal axis 95 therebetween. The first and second discharge screws 62A, 62B each define a respective thread form such that during rotation of the discharge screw set 60, the thread forms of the first and second discharge screws 62A, 62B are mirror images to each other relative to the longitudinal axis 94. The discharge screw set 60 includes the receiving end 64 for receiving the objects 10 outputted from the dividing screw set 42, and a discharge end 66 from which the objects 10 are conveyed to the outfeed portion 90 of the conveying mechanism 20. The discharge screws 62A, 62B are configured to be driven by drive units 118 in opposing directions relative to the longitudinal axis 94 defined by the conveyor 22. In the present example, discharge screw 62A is configured to rotate clockwise, and discharge screw 62B is configured to rotate counter-clockwise, as viewed from the discharge end 66 of the discharge screw set 60. In the example shown in FIGS. 4 through 7, each of the discharge screws 62A, 62B is a constant lead screw. In the example shown, the discharge screws 62A, 62B and the dividing screws 44A, 44B have the same pitch, and the discharge screws 62A, 62B have the same lead L1 as the infeed portion 52 of the dividing screws 44A, 44B. It would be understood that the example shown is illustrative and non-limiting, and, for example, the discharge screws 62A, 62B could have a lead which is variable from the receiving end 64 to the discharge end 66 to change the spacing of the objects 10 along the longitudinal axis, e.g., longitudinally, as they are conveyed through the discharge screw set 60.

Figure 11:
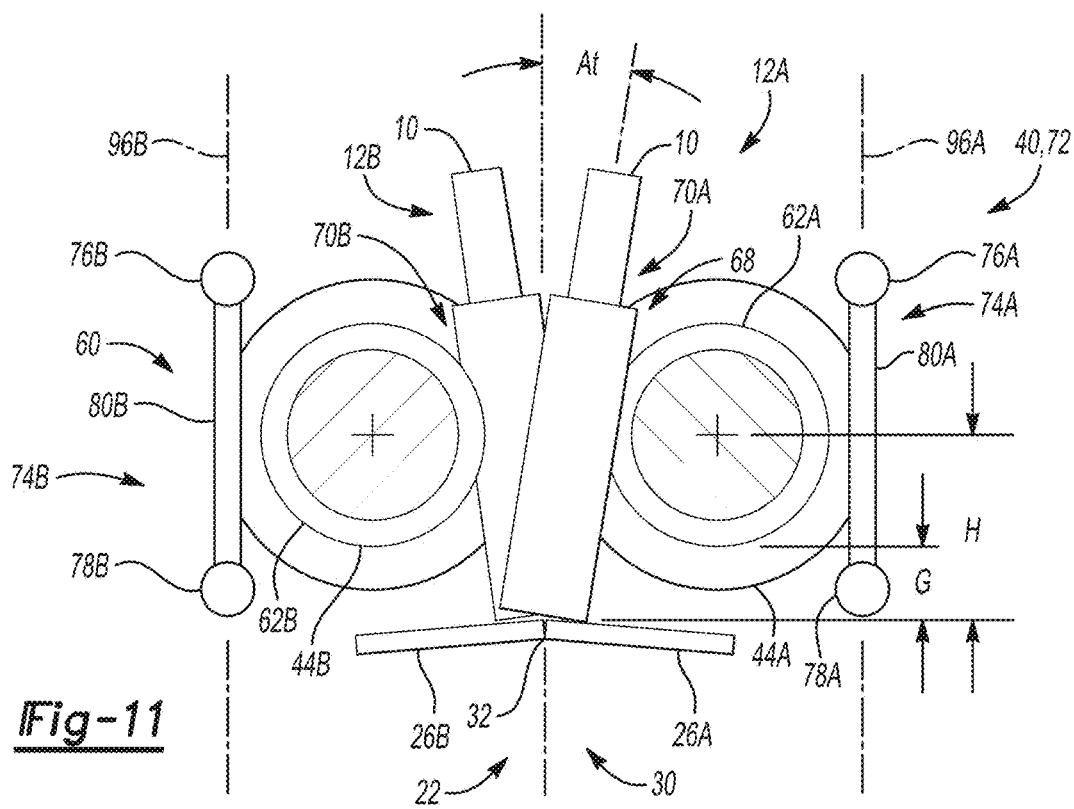
FIG. 11 is a schematic view of section 11-11 of the divider system of FIG. 8, showing divided objects being outputted from the dividing screw set.
Figure 12:
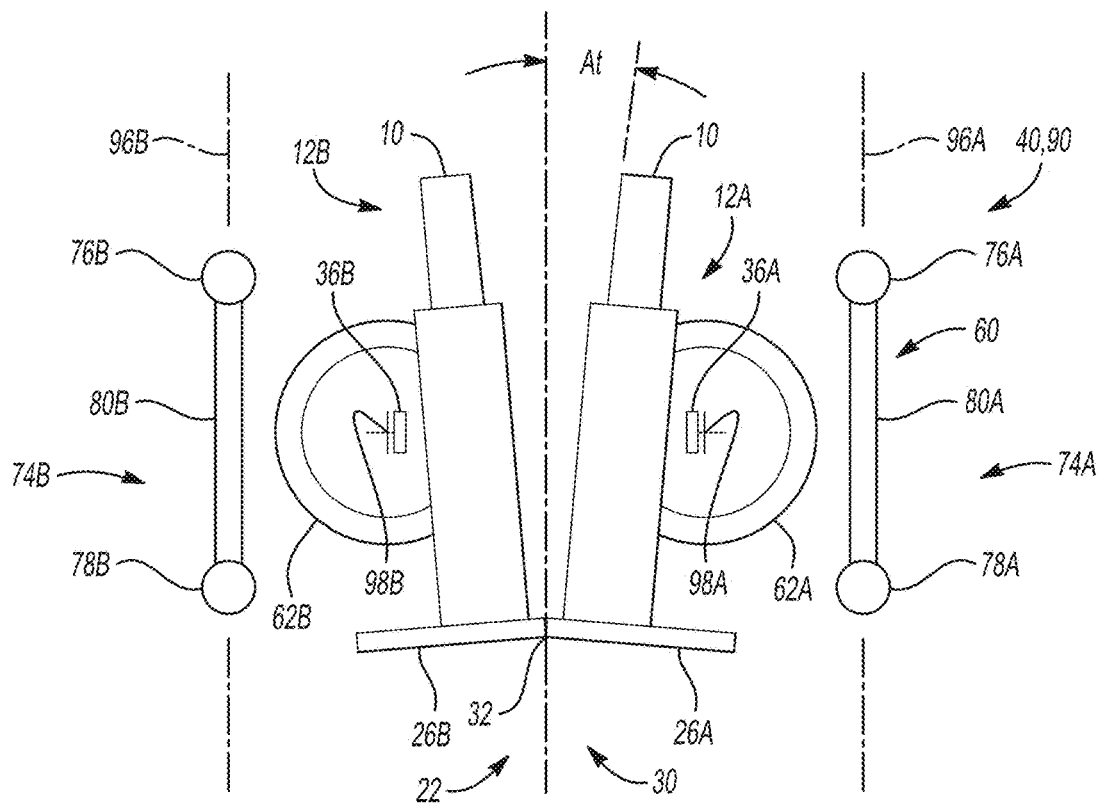
FIG. 12 is a schematic view of section 12-12 of the divider system of FIG. 8, showing divided objects being conveyed by the discharge screw set on the discharge belts.

As shown in the figures, and as illustrated by FIGS. 17-18, the discharge screws 62A, 62B are aligned such that the screw axes 98 of the discharge screws 62A, 62B are parallel to each other and to the longitudinal axis 94, and are spaced laterally from the longitudinal axis 94 and from each other to define the discharge channel 68 including a plurality of discharge pockets 70A, 70B distributed longitudinally, e.g., along the length, of the discharge screw set 60. The shape of each discharge pocket 70A, 70B is defined by the screw form of the discharge screws 62A, 62B. As shown in FIGS. 5-7 and FIGS. 11 and 12, the conveyor 22, in the discharge channel 68 is peaked such that each of the discharge belts 26A, 26B is tilted away and downward (as viewed on the page) from a central peak at a peak angle Ap. As such, and as shown in FIGS. 6 and 7 and illustrated in FIG. 17, an object 10 being outputted from the output end 48 of the dividing screw set 42 will be tilted into one of the discharge pockets 70A, 70B and conveyed in the tilted position along the conveyor 22. In the example shown, the root (minor) diameter and crest (major) diameter of the screw form of the discharge screws 62A, 62B is relatively smaller, respectively, than the root (minor) diameter and the crest (major) diameter of the screw form of the dividing screws 44A, 44B, such that, as the object 10 is outputted from the dividing screw set 42 into one of the discharge pockets 70A, 70B, the tilt angle At of the object 10 can increase, as shown in FIGS. 10-12, as compared to the tilt angle At of the object 10 in the dividing pocket 58A, 58B, and such that the object series 12A is further divided laterally from the object series 12B as the object series 12A and 12B are conveyed by the discharge screws 62A, 62B through the discharge channel 68. As shown in FIGS. 6-7 and 17 and in additional detail in FIGS. 22-23, objects c1, c3, c5, etc. of the object series 12A are discharged from dividing pocket 58A as indicated by the arrow 120 and fed into discharge pockets 70A of discharge screw 62A, and conveyed by rotation of the discharge screw 62A and movement of the discharge belt 26A through the discharge channel 68 for discharge into the first discharge lane 34A. Likewise, objects c2, c4, c6, etc. of the object series 12B are discharged from dividing pocket 58B as indicated by arrow 122 and fed into discharge pockets 70B of discharge screw 62B, and conveyed by rotation of the discharge screw 62B and movement of the discharge belt 26B through the discharge channel 68 for discharge into the second discharge lane 34B.

Figure 13:
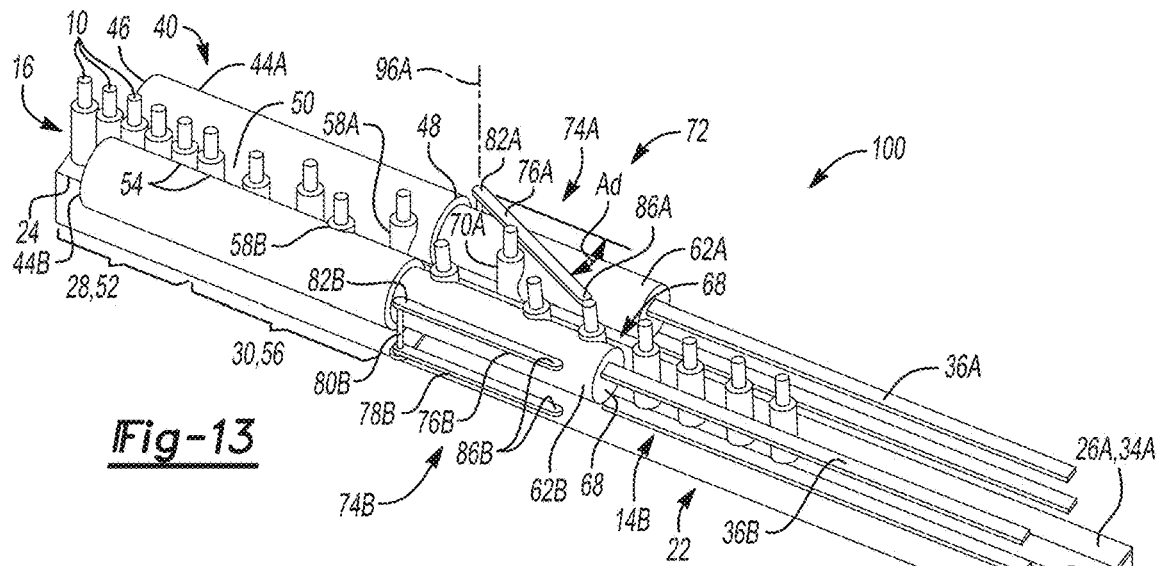
FIG. 13 is a schematic perspective illustration of the divider system of FIG. 3, showing a group of the divided objects being diverted by the diverting mechanism into a first one of the discharge lanes.
Figure 14:
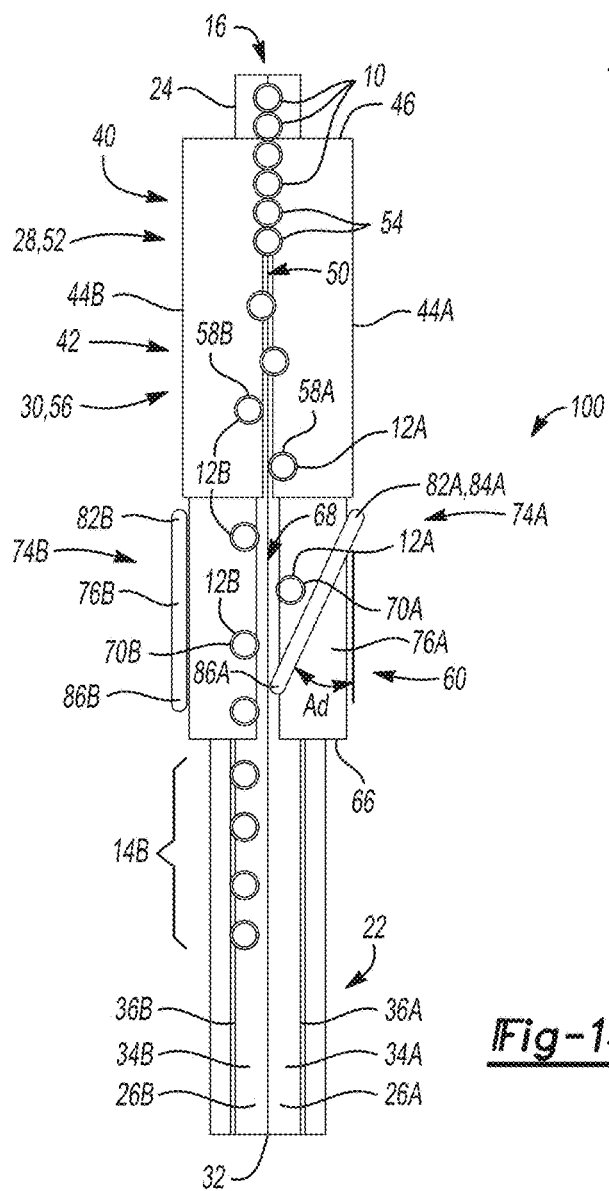
FIG. 14 is a schematic top view of the divider system of FIG. 13.
Figure 15:
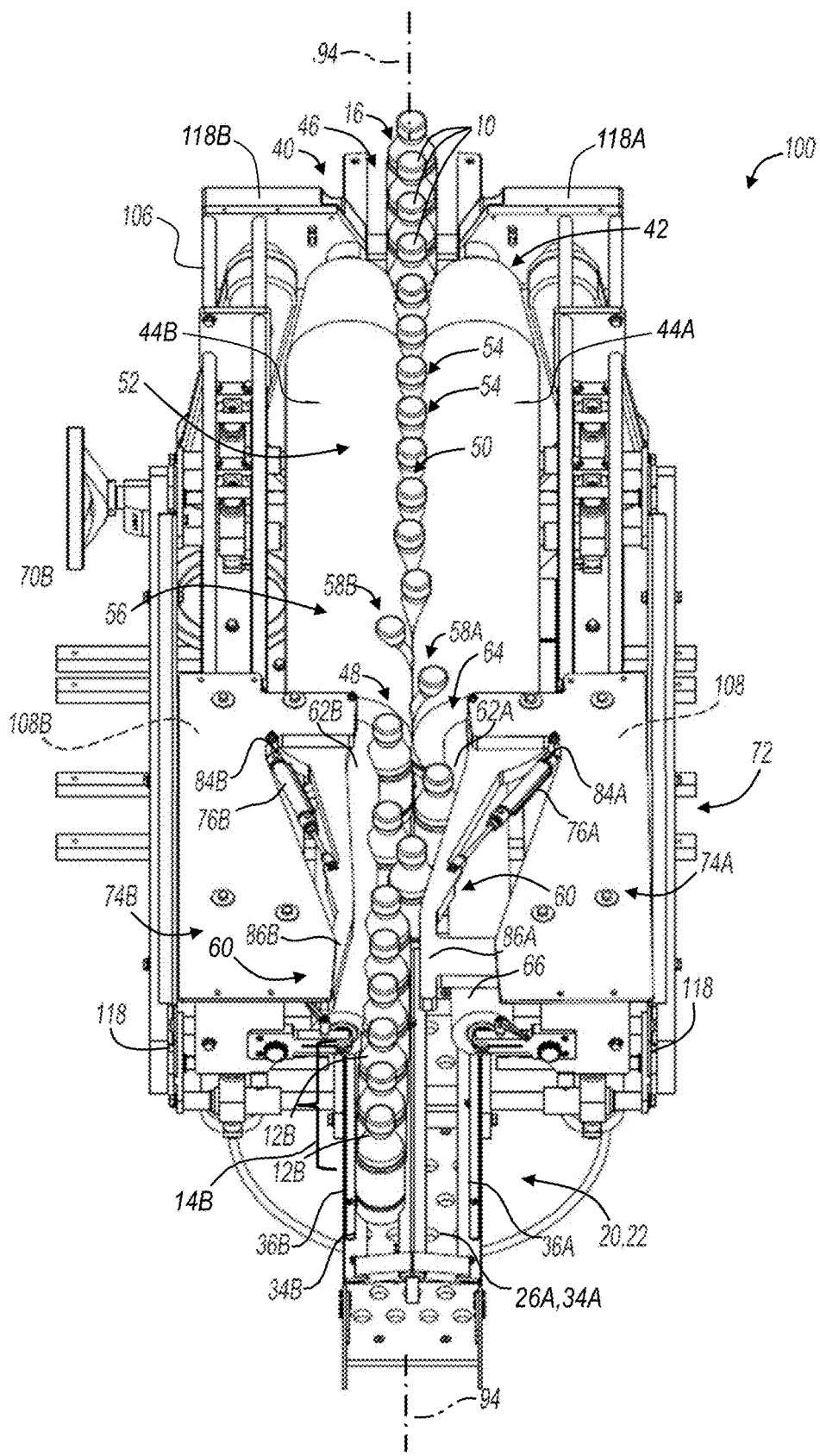
FIG. 15 is a photographic image of a perspective top view of the divider system of FIG. 13 showing a diverter element of the diverting mechanism diverting divided objects into a selected one of the discharge lanes.
Figure 22:
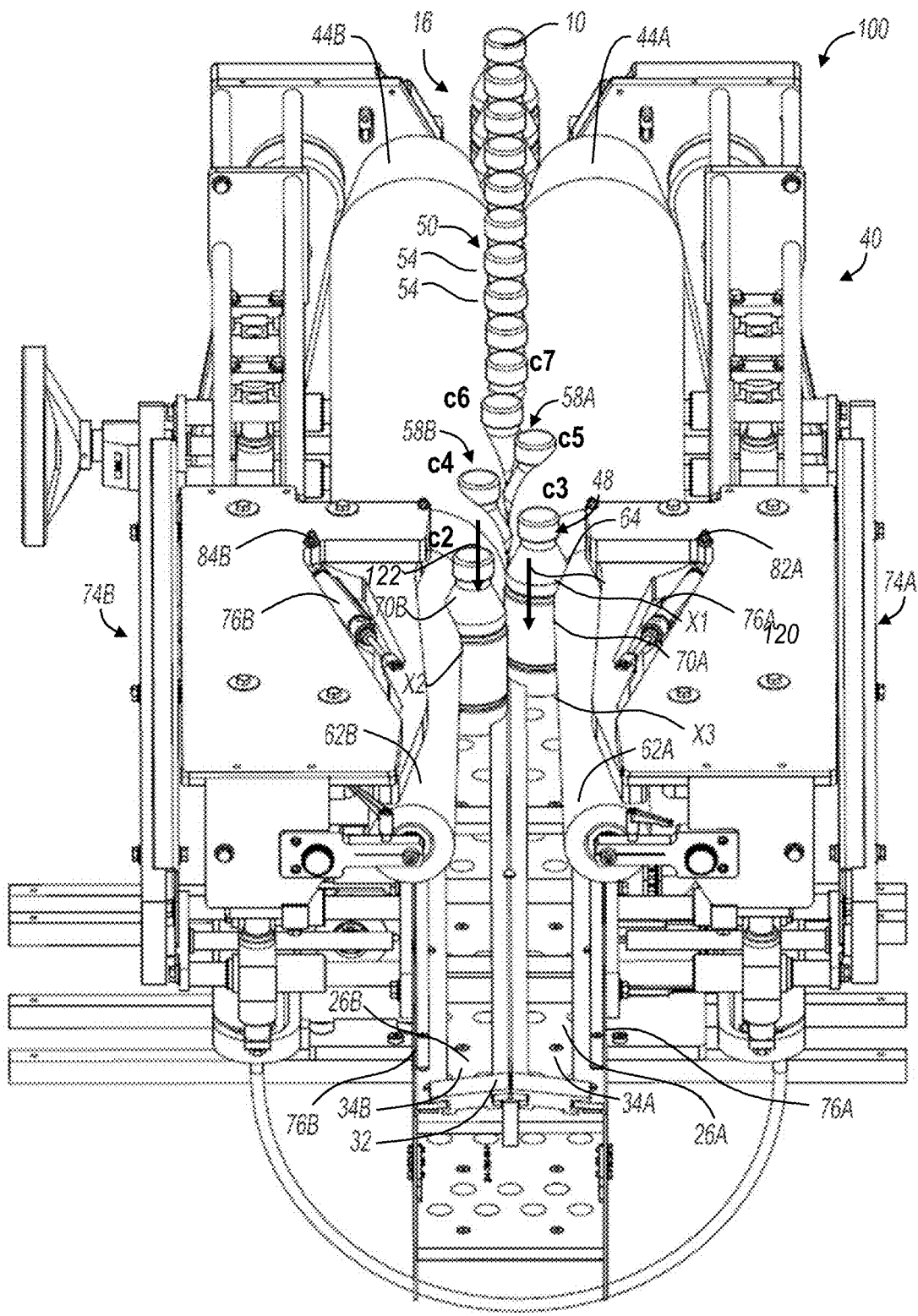
Figure 23:
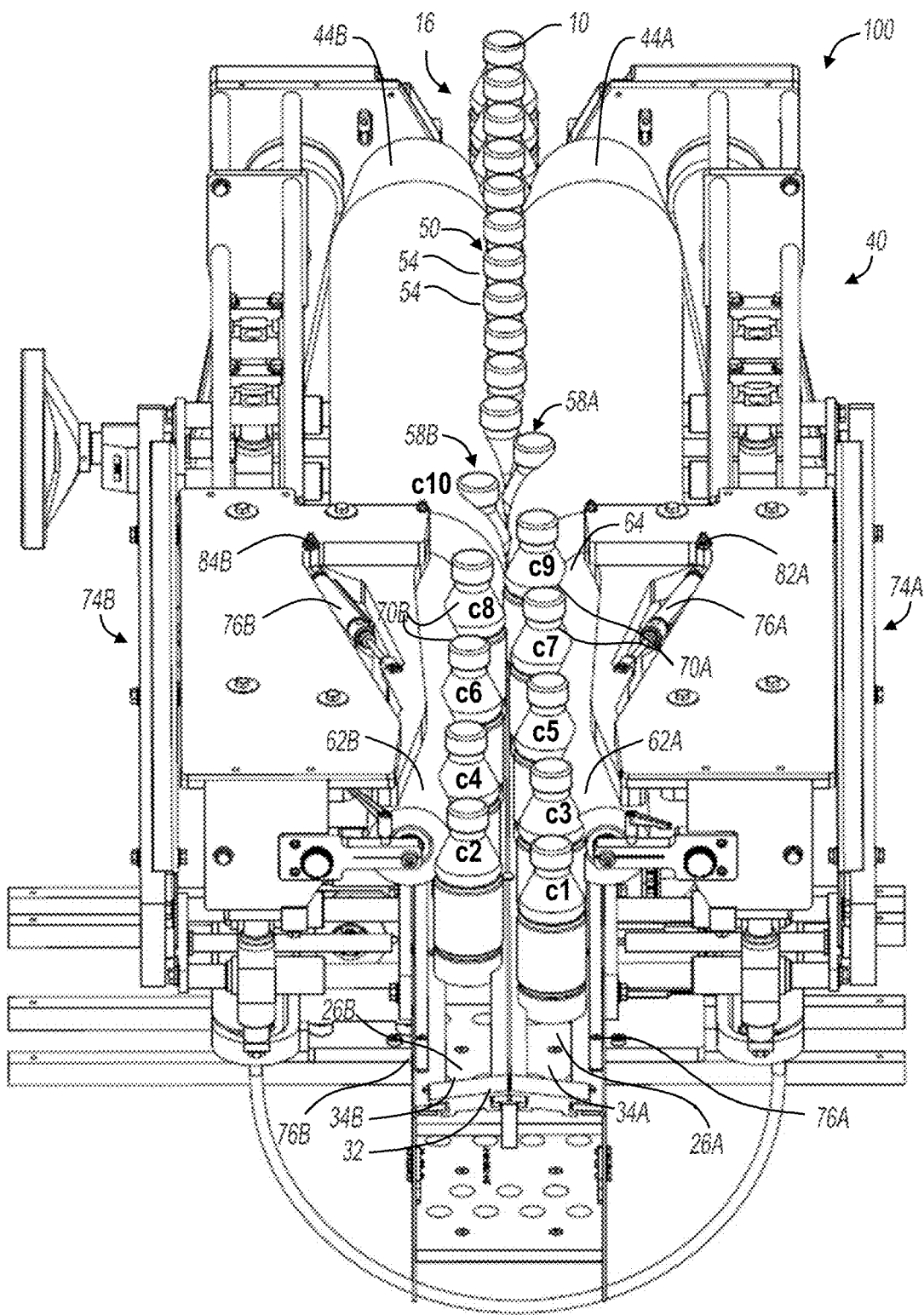
Figure 24:
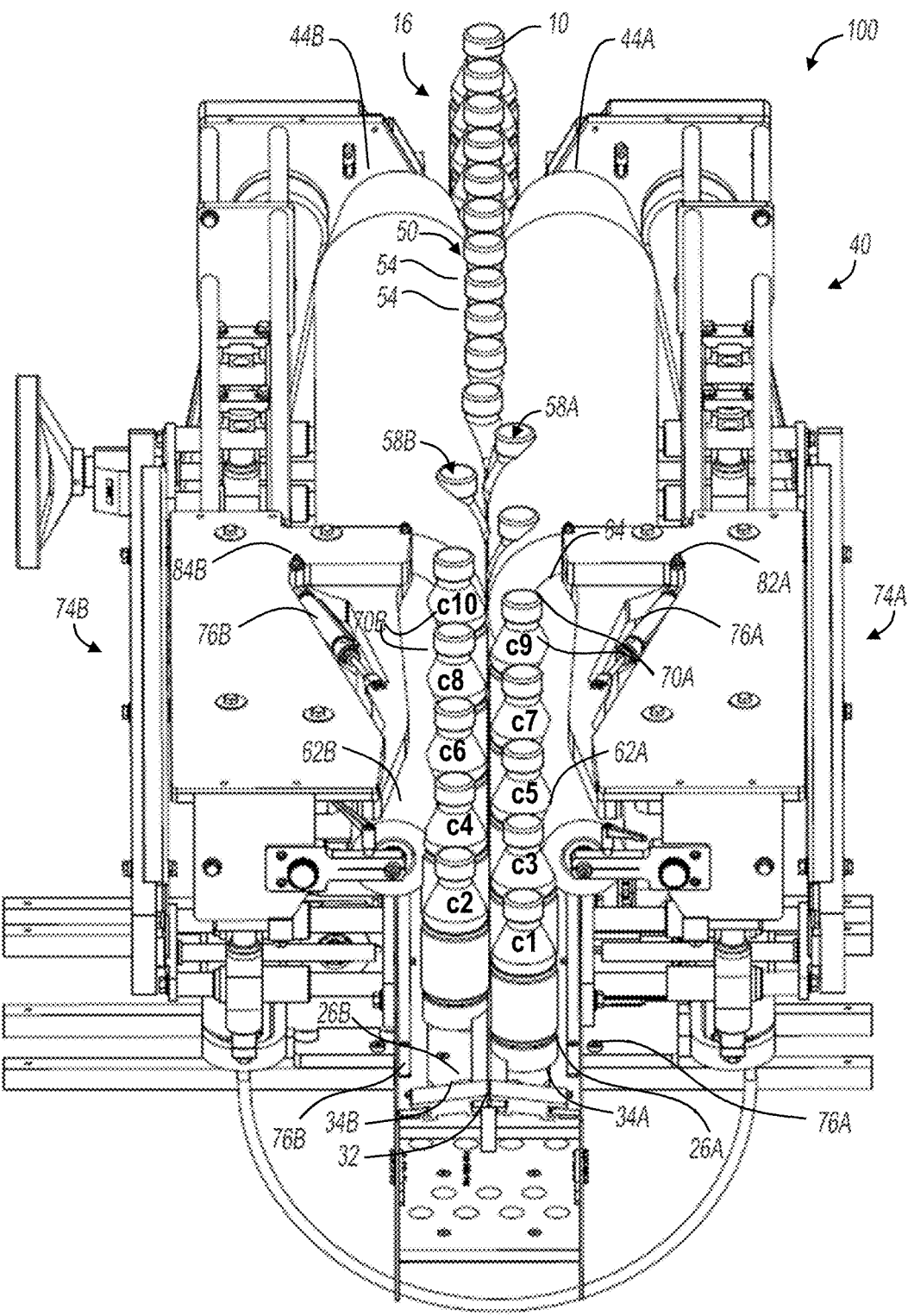
Figure 25:
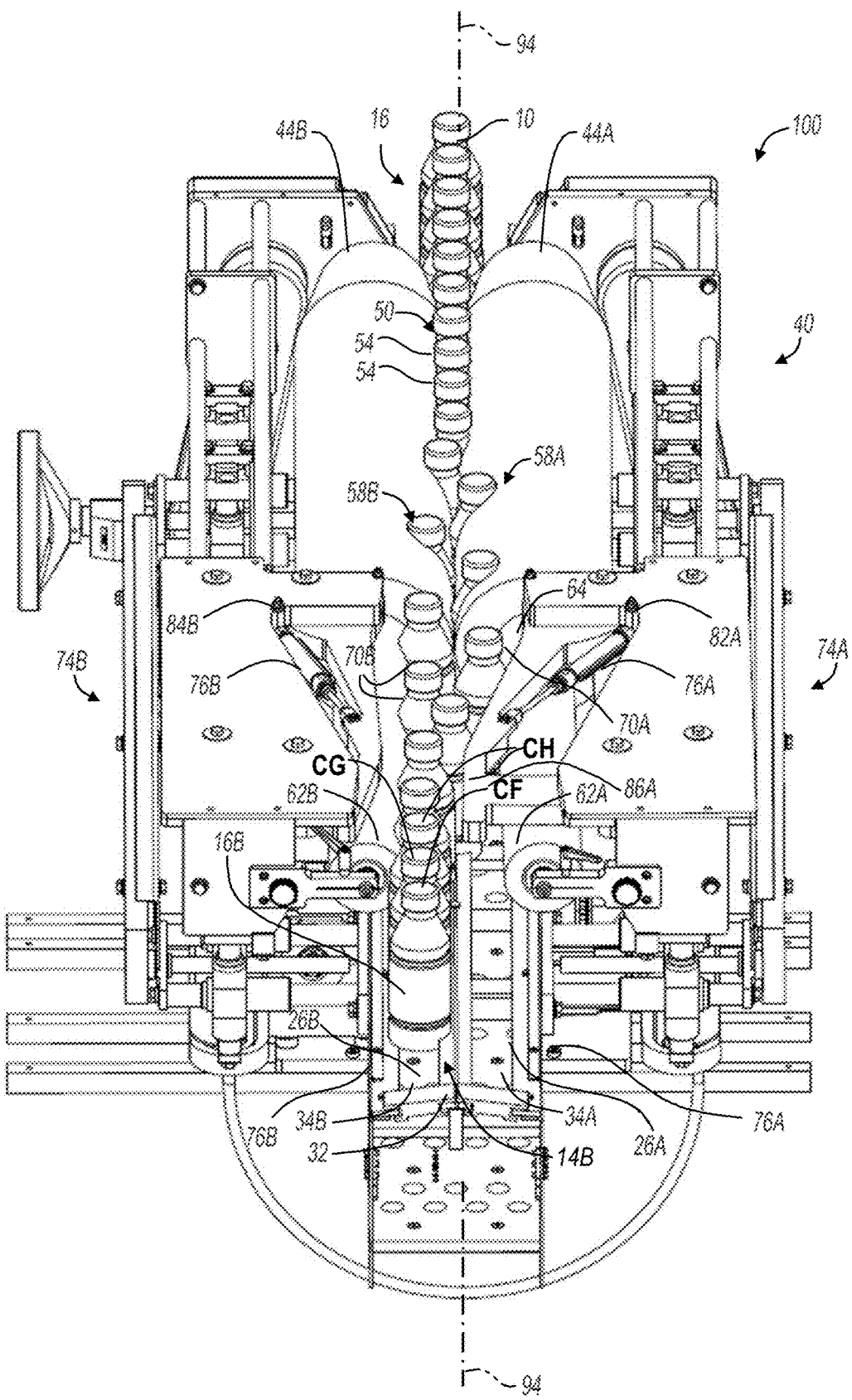
Figure 27:
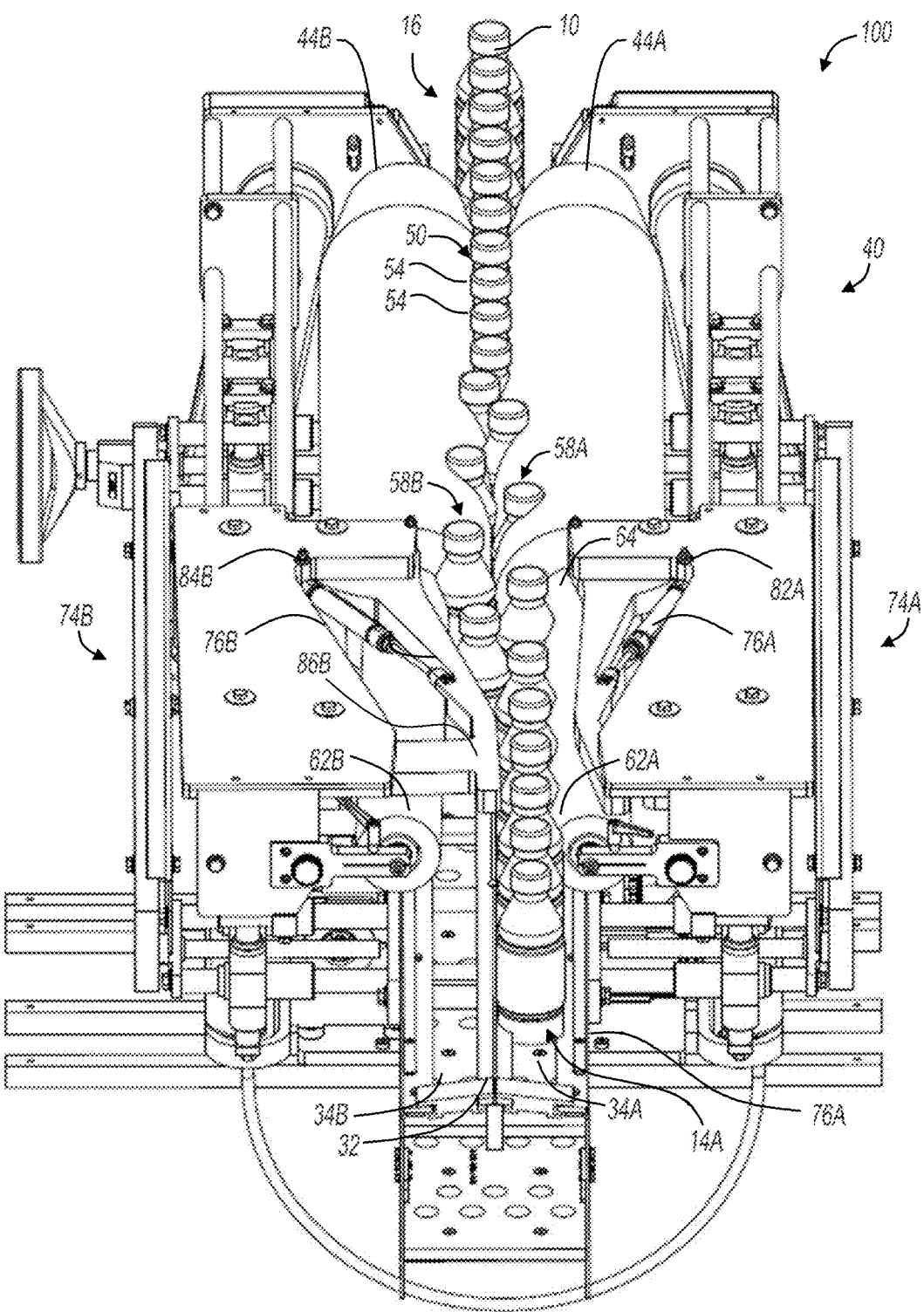

FIGS. 6 and 7 and FIGS. 21-24 illustrate object series 12A being divided from the sequence of objects 10, such that objects c1, c3, c5, c7 etc. are, as previously described, divided into a dividing pocket 58A of dividing screw 44A and outputted into a pocket 70A of the discharge screw 62A. As illustrated by the figures, the objects c1, c3, c5, c7 etc. are singulated in the dividing portion 56 and outputted to the discharge screw 62A such that every other discharge pocket 70A is left empty as the objects c1, c3, c5, c7 etc. are received by the discharge screw 62A. Referring to FIGS. 7 and 17 and FIGS. 22 and 23, for example, the discharge pocket 70A between the discharge pocket 70A in which object c1 is positioned and the discharge pocket 70A in which object c3 is positioned is an empty pocket X1. As shown beginning with FIG. 21, and illustrated in FIG. 17, the objects c1, c3, c5, c7 are outputted to every other discharge pocket 70A, such that the empty pocket X1 is maintained between longitudinally adjacent objects c1 and c3, an empty pocket X3 is maintained between longitudinally adjacent objects c3 and c5, and so on. Likewise, as object series 12B is divided into a dividing pocket 58B and outputted to the discharge screw 62B, every other discharge pocket 70B is left empty as the objects c2, c4, c6, c8 etc. are received by the discharge screw 62B. The rotation of discharge screws 62A, 62B is coordinated such that each object 10 in series 12A is conveyed in a discharge pocket 70A which is laterally opposite an empty discharge pocket 70B, and each object 10 in series 12B is conveyed in a discharge pocket 70B which is laterally opposite an empty discharge pocket 70A (see FIGS. 22-23 and FIG. 17). Referring to FIGS. 22 and 17, for example, an empty pocket X2 is maintained in advance of object c2 and an empty pocket X4 is maintained between objects c2 and c4 output to discharge screw 62B. Object c1 is laterally opposite empty pocket X2, object c2 is laterally opposite empty pocket X1, object c3 is laterally opposite empty pocket X4, object c4 is laterally opposite empty pocket X3, and so on. By dividing the object series 12A, 12B such that each object 10 in the series 12A, 12B is laterally opposite an empty pocket X in the discharge channel 68, the objects 10 from series 12A can be respectively diverted, by actuation of the diverter 74A, into the respective laterally opposite empty pockets 70B in discharge screw 62B to form a diverted group 14B, as shown in FIGS. 13, 14 and 25. Likewise, the objects 10 from series 12B can be respectively diverted, by actuation of the diverter 74B, into the respective laterally opposite empty pockets 70A in discharge screw 62A to form a diverted group 14A, as shown in FIG. 27.

As shown in FIGS. 4 and 8 and FIGS. 24 and 26, the object series 12A is conveyed by the discharge screw 62A and along the discharge belt 26A to the discharge end 66 of the discharge screw set 60, where the objects c1, c3, c5, etc. of the series 12A are conveyed into the discharge lane 34A for conveyance on the discharge belt 26A through the conveyor outfeed portion 90 to the outfeed end 92. Likewise, the object series 12B is conveyed by the discharge screw 62B and along the discharge belt 26B to the discharge end 66, where the objects c2, c4, c6, etc. of the series 12B are conveyed into the discharge lane 34B for conveyance on the discharge belt 26B through the outfeed portion 90 to the outfeed end 92. In a non-limiting example, the conveyor 22 in the outfeed portion 90 can be peaked as shown in FIG. 12, such that objects 10 on the respective discharge belts 26A, 26B are tilted against the respective discharge rails 36A, 36B, to urge the objects 10 to remain in their respective discharge lane 34A, 34B and to stabilize and/or support the objects 10 in their respective discharge lanes 34A, 34B as they are conveyed through the outfeed portion 90.

Referring to FIGS. 3 and 4, FIGS. 13-15, and FIG. 27, the divider system 100 includes a diverting mechanism 72. In the example shown, the diverting mechanism includes a first diverter 74A and a second diverter 74B. the diverting mechanism 72 is in communication with the controller 104 such that each of the first and second diverters 74A, 74B are selectively actuable to divert the series 12A, 12B of the divided objects 10 onto one of the discharge belts 26A, 26B to form a diverted group 14 of objects 10, where the diverted group 14 of objects 10 are then conveyed via a respective one of the discharge lanes 34A, 34B to the outfeed end 92 of the conveyor 20. In an illustrative example shown in FIGS. 13-15 and FIG. 18, the diverter 74A includes a diverter element 76A which is configured, in a non-limiting example, as a pivoting arm connected at a first end 84A via a pivotable joint 82A to a connecting member 80A, such that the diverter element 76A is pivotable about a pivot axis 96A between a non-actuated position shown in FIGS. 3 and 4 and an actuated position shown in FIGS. 13-16 and FIG. 27. In the actuated position the diverter element 76A is pivoted to a diverter angle Ad as shown in FIGS. 13, 14 and 18, such that a second end 86A of the diverter element 76A pivots into the discharge channel 68 to contact objects 10 in the series 12A and divert the objects in series 12A from discharge belt 26A to discharge belt 26B, where each of the diverted objects in series 12A is received into a respective empty pocket X in the discharge screw 62B and conveyed by the discharge screw 62B and discharge belt 26B out of the discharge channel 68 to the discharge lane 34B of the outfeed portion 90. The diverter 74A includes an actuator 108A for actuating and de-actuating the diverter element 76A. The diverter element 76A, in the illustrative example, is connected to the actuator 108A by a linkage 88A actuable by the actuator 108A to pivot the diverter element 76A between the actuated and non-actuated positions. The linkage 88A shown in FIG. 15 includes a rod and cylinder assembly for moving the diverter element 76A. This example is non-limiting and it would be understood that other configurations of linkage 88A could be used. The actuator 108A can be, by way of non-limiting example, one of a hydraulic actuator, a pneumatic actuator, a magnetically actuated servo mechanism, or other like actuator.

Each of the diverters 74A, 74B can include a respective second diverter element 78A, 78B, as shown in FIGS. 11 and 13. In the example shown, the first (upper) diverter element 76A pivots into the discharge channel 68 to contact the upper portion (as viewed on the page) of the object 10 protruding above the discharge screw 62A, and the second (lower) diverter element 78A pivots into the discharge channel 68 via a clearance gap G between the conveyor 22 and the discharge screw 62A, to contact the lower portion (as viewed on the page) of the object 10. By contacting the object 10 both above and below the discharge screw 62A with, respectively, the upper and lower diverter elements 76A, 78A, the object 10 is stabilized and supported as it is diverted from discharge belt 26A to discharge belt 26B and as the object 10 is diverted into its corresponding pocket 70B in discharge screw 62B. It would be understood that, for objects 10 which are shaped and/or sized such that the upper portion of the object 10 does not protrude above the discharge screw, the object 10 can be diverted using the lower diverter element 78A only. In a non-limiting example, the lower diverter element 78A is a pivoting arm connected at a first end 84A via the pivotable joint 82A to the connecting member 80A, such that the diverter element 78A is pivotable about the pivot axis 96A. As illustrated in FIGS. 15 and 21-27, each of the diverter elements 76A, 76B, 78A, 78B can include a contoured surface for contacting the objects 10, such that, during selective actuation of any of the diverter elements 76A, 76B, 78A, 78B to divert the objects 10, contact between the contoured surface and the diverted object 10 is gradual, such that the diverted object 10 remains stabilized through the diversion sequence.

FIGS. 13-14, 18 and 24-26 illustrate actuation of the diverting mechanism 72 using the diverter 74A to selectively divert objects 10 from discharge belt 26A to discharge belt 26B to form a diverted group 14B of objects 10 conveyed to discharge lane 34B, and de-actuation of the diverter 74A to resume conveyance of the divided series 12A on discharge belt 26A and to discharge lane 34A. In FIG. 24, after division of sequence c1, c2, c3, c4, etc. of objects 10 by the dividing screw set 42 into object series 12A, 12B, as previously described herein, and prior to actuation of the diverter 74A, the first series 12A of divided objects c1, c3, c5, etc. is shown being conveyed by discharge screw 62A and discharge belt 26A to discharge lane 34A, and the second series 12B of divided objects c2, c4, c6, etc. is shown being conveyed by discharge screw 62B and discharge belt 26B to discharge lane 34B. In FIGS. 25 and 18, in an illustrative example, the diverter 74A is actuated by the actuator 108A to initiate pivoting of the diverter element 76A using linkage 88A into the discharge channel 68, such that second end 86A of the diverter element 76A pivots into contact with object cG, to apply a lateral force to divert the objects 10 of series 12A, beginning with object cG, from their respective pockets 70A to respective empty pockets XB of discharge screw 62B, and from discharge belt 26A to discharge belt 26A, to form a diverted group 14B. The diverted group 14B, beginning with object cG, cH, and so on, is conveyed from the discharge channel 68 on discharge belt 26B to the discharge lane 34B. FIG. 25 shows the diverter element 76A fully actuated, e.g., fully pivoted to the diverter angle Ad, such that in the fully pivoted position, the diverter element 76A is contacting and diverting each object 10 of series 12A as it is outputted from the dividing screw 44A into an empty pocket XB in discharge screw 62B.

Figure 26:
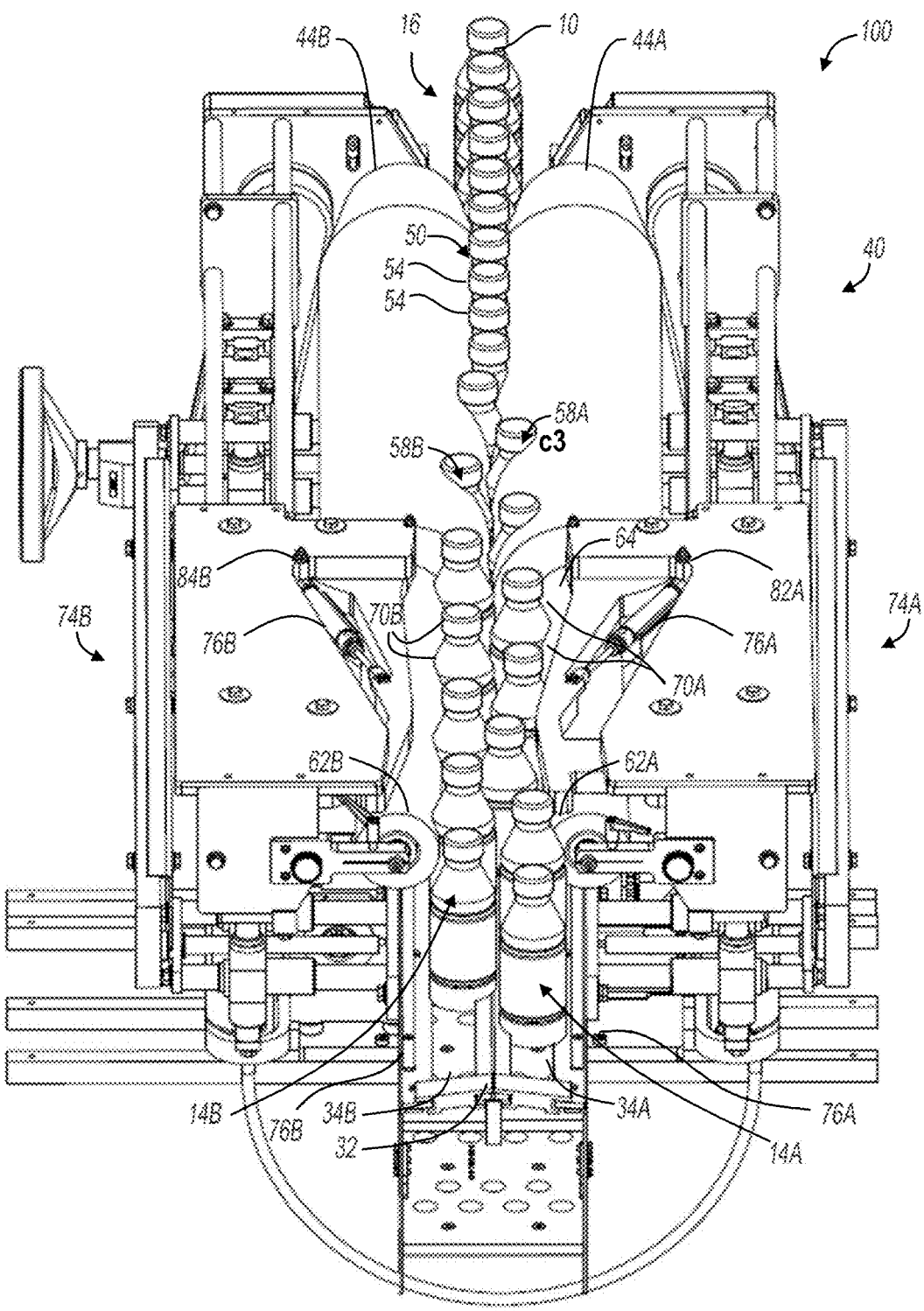

In FIG. 26, in an illustrative example, the diverter 74A is shown being de-actuated by the actuator 108A such that the diverter element 76A is pivoted away from the diverted group 14 and out of contact with objects 10 in series 12A, such that the objects 10 in series 12A remain on discharge belt 26A as they are conveyed, undiverted, through the discharge channel 68 to discharge lane 34A, as shown in FIG. 26. Summarizing the example shown in FIGS. 25-26, the diverting mechanism 72 is actuated to divert objects 10 in object series 12A from discharge screw 62A to discharge screw 62B and from discharge belt 26A to discharge belt 26B, such that the objects 10 in object series 12B and the objects 10 in object series 12A which have been diverted to discharge screw 62B are discharged from discharge channel 68 to discharge lane 34B as a diverted group 14B, and the diverting mechanism 72 is subsequently de-actuated such that, as the diverter 74A is retracted, the objects 10 in the object series 12A remain on discharge belt 26A and the object series 12A, 12B are again discharged on their respective discharge belts 26A, 26B. The example of diverting a plurality of objects 10 from a series 12A, 12B into a diverted group 14 is non-limiting, and it would be understood that the actuation and de-actuation of the diverting mechanism 72 can be controlled by the actuators 108A, 108B and/or the controller 104 to selectively divert, in a single actuation/de-actuation cycle, as few as a single object 10 or a plurality of objects 10 from one to another of the discharge screws 62A, 62B and discharge belts 26A, 26B.

Referring to FIGS. 1 and 4 and FIGS. 13-14, the diverting mechanism 72, in a non-limiting example, includes the first diverter 74A and a second diverter 74B. The second diverter 74B is configured as described for the first diverter 74A, such that the second diverter 74B includes a diverter element 76B which in a non-limiting example is configured as a pivoting arm connected at a first end 84B via a pivotable joint 82B to a connecting member 80B, such that the diverter element 76B is pivotable about a pivot axis 96B between a non-actuated position shown in FIGS. 13 and 14 and an actuated position shown in FIG. 27. In the actuated position the diverter element 76B is pivoted to a diverter angle Ad as shown in FIG. 27, such that a second end 86B of the diverter element 76B pivots into the discharge channel 68 to contact objects 10 in the series 12B and divert the objects in series 12B from discharge belt 26B to discharge belt 26A, where each of the diverted objects in series 12B is received into a respective empty pocket X (see XA, XB in FIG. 18) in the discharge screw 62A and conveyed by the discharge screw 62A and discharge belt 26A out of the discharge channel 68 to the discharge lane 34A of the outfeed portion 90. The diverter 74B includes an actuator 108B, indicated generally in FIG. 4, for actuating and de-actuating the diverter element 76B. In a non-limiting example the actuator 108B is configured as described for actuator 108A. The diverter 74B can include a second diverter element 78B (see FIGS. 11 and 13), where, in the example shown, the first (upper) diverter element 76B pivots into the discharge channel 68 to contact the upper portion (as viewed on the page) of the object 10 protruding above the discharge screw 62B, and the second (lower) diverter element 78B pivots into the discharge channel 68 via a clearance gap G between the conveyor 22 and the discharge screw 62B, to contact the lower portion (as viewed on the page) of the object 10. By contacting the object 10 both above and below the discharge screw 62B with, respectively, the upper and lower diverter elements 76B, 78B, the object 10 is stabilized and supported as it is diverted from discharge belt 26B to discharge belt 26A and as the object 10 is diverted into its corresponding pocket 70A in discharge screw 62A. It would be understood that, for objects 10 which are shaped and/or sized such that the upper portion of the object 10 does not protrude above the discharge screw, the object 10 can be diverted using the lower diverter element 78B only. In a non-limiting example, the lower diverter element 78B is a pivoting arm connected at a first end 84B via the pivotable joint 82B to the connecting member 80B, such that the diverter element 78B is pivotable about the pivot axis 96B.

The diverting mechanism 72 can be actuated and de-actuated, for example, by commands and/or signals selectively outputted from the controller 104 to the diverters 74A, 74B, for example, via actuators 108A, 108B. The controller 104 can be in communication with one or more devices which provide data and/or signals to the controller 104, such that the data and/or signals received by the controller 104 can be used by the controller 104 to determine when and for how long one or the other of the diverters 74A, 74B should be actuated. By way of non-limiting example, the devices in communication with the controller 104 can include equipment and/or devices which are upstream and/or downstream from the divider system 100, where signals received from the equipment can include commands to divert the objects 10 to one or the other of discharge lanes 34A, 34B in response to conditions of the upstream and/or downstream equipment, including conditions related to line balancing and/or capacity requirements of the downstream equipment, equipment downtime due to changeover, set-up or other reasons, etc.

In another example, the devices in communication with the controller 104 can include one or more sensors which can be located upstream and/or downstream from the divider system 100, and/or can be included in the divider system 100, for outputting signals to the controller 104 which can be used by the controller 104 to determine whether actuation and/or de-actuation of diverting mechanism 72 and/or the diverters 74A, 74B is required. By way of example, one or more of the sensors can be operable as a photosensor for detecting color, shape, object condition, etc., a scanner such as a bar code scanner, a sensor to detect a dimension, weight, or other quantifiable, e.g., measurable characteristics of an object 10, etc. In a non-limiting example, the divider system 100 can include at least one sensor to sense a condition of the object 10, and to output a condition signal to the controller 104 which is indicative of the condition of the object 10. By way of example, the condition may be an indication of the shape, size, color, type, or other identifying condition of the object 10 that may differentiate the object 10 from other objects 10 in the sequence of objects 10 located, for example, in the infeed lane 16 and/or in the infeed portion 52 of the dividing screw set 42. The controller 104, in response to the condition signal, can selectively output a command to the diverting mechanism 72 to divert the object 10 associated with the condition signal to one or the other of the discharge lanes 34A, 34B. In one example, the condition may be a color, label, bar code or other distinguishing feature of the object 10 which identifies the object 10 as one of a first type to be diverted to discharge lane 34A or one of a second type to be diverted to discharge lane 34B. In another example, the condition may be a feature of the object 10 which is used to determine if a standard for the object 10 has been met. For example, the object 10 can be configured as a liquid container enclosed by a cap, as shown in the photographs of FIGS. 21-27, and the sensor can be configured to sense presence of the cap. The controller 104 can be configured to divert objects 10 with missing caps to one of the discharge lanes 26A as rejected objects, and to divert objects 10 with caps present to the other of the discharge lanes 26B as acceptable for further processing. In another example, the sensor can be configured to sense a fill condition of the container, for example, to detect a partially filled or empty container, such that the partially filled or empty container can be diverted to one of the discharge lanes 26A, 26B as a rejected object 10. The examples provided herein are non-limiting, and it would be understood that one or more sensors can be included in the divider system 100 to sense object conditions which can cause the controller 104 to selectively actuate and/or de-actuate the diverting mechanism 72.

The controller 104, in a non-limiting example, is configured to control the drive mechanism 110 of the divider system 100. In the example shown in FIGS. 19 and 20, the drive mechanism 110 includes a drive motor 112, synchro bars 114 and gearing 116, which is arranged to concurrently drive rotation of the dividing screws 44A, 44B, rotation of the discharge screws 62A, 62B, and movement of the conveyor 22 including discharge belts 26A, 26B. The controller 104 controls the drive mechanism 110, including controlling the rotation speed of the dividing screws 44A, 44B, the rotation speed of the discharge screws 62A, 62B and the belt speed of the conveyor 22, such the conveying force imposed by the conveyor 22 on the objects 10 being conveyed in the dividing pockets 58 through the dividing channel 50 and/or on the objects 10 being conveyed in the discharge pockets 70 through the discharge channel 68 is at equilibrium with the conveying forces imposed on the objects 10 by the dividing pockets 58 and the discharge pockets 70. It would be understood that when the forces imposed by the dividing pockets 58, the discharge pockets 70, and the discharge belts 26 (being driven by the conveyor 22) are controlled such that the forces are at equilibrium, the objects 10 are conveyed with no destabilizing drag force or destabilizing accelerating force imposed on the objects 10 relative to the conveying forces of the dividing pockets 58 and the discharge pockets 70, such that the objects 10 are stabilized in the dividing pockets 58 and discharge pockets 70 and are retained in their respective pockets 58, 70 as they are conveyed through the dividing channel 50 and discharge channel 68. In one example, the rotation rate and pitch of each of the dividing screws 44A, 44B and the discharge screws 62A, 62B is proportional to the conveyor speed such that there is no forward or reverse drag or force exerted by the screw face on the object 10, e.g., such that the object 10 is moved through the divider mechanism 100 at the conveyor speed, and therefore remains upright and stable with the feeding force exerted on the object 10 by the screw form equivalent in direction and magnitude to the conveying force exerted on the object 10 by the conveyor. In one example, the controller 104 determines and controls the speed of the conveyor 22 and the revolution speed of the dividing screws 44A, 44B and the discharge screws 62A, 62B, based on the pitch of the dividing screws 44A, 44B and the pitch of the discharge screws 62A, 62B, such that the linear speed of the conveyor 22, the linear speed of the discharge belts 26A, 26B, the linear speed of the dividing screws 44A, 44B and the linear speed of the discharge screws 62A, 62B are the same.

The illustrative example of a divider system 100 shown in FIGS. 1-27 is not intended to be limiting. It would be understood that the divider system 100, including the dividing mechanism 40 and/or the diverting mechanism 72 can be configured within the scope of the description provided herein to divide and/or divert objects 10 of shapes, sizes and configurations other than those shown in the figures by modifying one or more of the dividing screw set 42, the discharge screw set 60, the diverting mechanism 72, and/or the conveyor 20 including the infeed belt 24, the flat and peaked portions 28, 30, the discharge belts 26A, 26B, and/or the outfeed portion 90. By way of example, modifications anticipated within the scope of the description including various combinations of double and single lead screw forms, combinations and modification of screw pitch and pocket depth to accommodate the shape of the object 10, modification of the width of the dividing channels 50 and/or the discharge channels 68 and/or the height of the dividing screw sets 42 and/or the discharge screw sets 60 relative to the conveyor 20 to accommodate and/or optimize stabilization of the object 10, etc. By way of example, modifications anticipated within the scope of the description including various configurations of the diverting mechanism 72, which can include modifications and/or variations of the shape and size of the diverter elements 76A, 76B, 78A, 78B, which can include arm configurations which are bent, curved, or otherwise shaped to adapt to the shape, size, weight, and/or other condition of the objects 10 being diverted. Further, the linkage 88A, 88B and/or the actuators 108A, 108B can be modified as required to accommodate the conditions of the objects 10 being diverted and/or modifications of the diverter elements 76A, 76B, 78A, 78B. for example, the actuators 108A, 108B can be actuated by one or more of hydraulic, pneumatic, magnetic, and electrical means, and the linkage 88A, 88B can be modified, for example, to actuate a diverter 74A, 74B configured other than a pivoting arm, for example, a plunger type diverter. The example of the conveyed object 10 shown in the figures is not limiting, and it would be understood that the object 10 can be other than a container, and could be one or more of a container, a carton, a case, a bottle, a can, etc., which could be positioned in and conveyed via the infeed pockets 54, the dividing pockets 58A, 58B, and the discharge pockets 70A, 70B.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire disclosed range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

The above features and other features and advantages of the present invention are readily apparent from the detailed description of the best modes for carrying out the invention described herein, when taken in connection with the accompanying drawings. While some of the best modes and other embodiments for carrying out the claimed invention have been described in detail, various alternative designs and embodiments exist for practicing the invention.

The invention claimed is:

1. A divider system operable to divide a sequence of objects into a first series of objects and a second series of objects, the divider system comprising:
    a screw set including a first screw and a second screw;
    wherein the first and second screws are rotatably mounted to define a channel therebetween;
    wherein the screw set is configured to receive, via the channel, a sequence of objects divided into a first series of objects received by the first screw and a second series of objects received by the second screw;
    a diverting mechanism comprising a first diverter; and
    wherein the first diverter is selectively actuable to divert objects received by the first screw from the first screw to the second screw.

2. The divider system of claim 1, wherein the diverting mechanism comprises:
    a second diverter; and
    wherein the second diverter is selectively actuable to divert objects from the second screw to the first screw.

3. The divider system of claim 1, further comprising:
    a sensor operable to sense an object condition of at least one object of the sequence of objects and output a condition signal to a controller;
    wherein the condition signal is indicative of the object condition; and
    wherein the diverting mechanism is selectively actuable by the controller in response to the condition signal.

4. The divider system of claim 3, wherein the object condition is defined by one of a color, a shape, a size, or a weight of the object, a defect condition of the object, and a condition of a downstream process.

5. The divider system of claim 1, further comprising:
    a controller;
    wherein the controller is in communication with the diverting mechanism and with a device;
    wherein the device is operable to receive objects from the sequence of objects;
    wherein the device is operable to output a state signal to the controller;
    wherein the state signal is indicative of a state of the device; and
    wherein the controller is operable to selectively actuate the diverting mechanism in response to the state signal.

6. The divider system of claim 1, wherein:
    wherein each of the first and second screws defines a respective thread form and is rotatable on a respective screw axis to define a longitudinal axis therebetween; and wherein the thread forms of the first and second screws are mirror images relative to the longitudinal axis during rotation of the screw set.

7. The divider system of claim 6, the system further comprising:
a plurality of first pockets defined by the respective thread form of the first screw;
wherein the plurality of first pockets are distributed longitudinally along the screw axis of the first screw;
wherein each object of the first series of objects is received into an alternate first pocket of the plurality of first pockets;
a plurality of second pockets defined by the respective thread form of the second screw;
wherein the plurality of second pockets are distributed longitudinally along the screw axis of the second screw; and
wherein each object of the second series of objects is received into an alternate second pocket of the plurality of second pockets.

8. The divider system of claim 1, wherein the diverting mechanism comprises:
a second diverter; and
wherein the second diverter is selectively actuable to divert objects from the second screw to the first screw.

9. The divider system of claim 1, further comprising:
the first diverter including a first diverting element and a second diverting element; and
wherein the first and second diverting elements are selectively actuable to divert objects from the first screw to the second screw.

10. The divider system of claim 9, wherein the first screw is intermediate the first diverting element and the second diverting element.

11. The divider system of claim 1, further comprising:
the first diverter including a pivot arm selectively pivotable between a first position and a second position; and
wherein the pivot arm is configured to divert objects from the first screw to the second screw when in the second position.

12. The divider system of claim 11, further comprising:
a longitudinal axis defined by the channel;
wherein in the second position, the pivot arm is oblique to the longitudinal axis.

13. A divider system operable to divide a sequence of objects into a first series of objects and a second series of objects, the divider system comprising:
a screw set including a first screw and a second screw;
wherein the first and second screws are rotatably mounted to define a channel therebetween;
wherein the screw set is configured to receive, via the channel, a sequence of objects divided into a first series of objects received by the first screw and a second series of objects received by the second screw;
a longitudinal axis defined by the channel;
a first belt extending longitudinally along the channel and adjacent the first screw;
a second belt extending longitudinally along the channel and adjacent the second screw;
wherein the first belt is tilted at a first tilt angle relative to the longitudinal axis such that objects received by the first screw are tilted on the first belt toward the first screw; and
wherein the second belt is tilted at a second tilt angle relative to the longitudinal axis such that objects received by the second screw are tilted on the second belt toward the second screw.

14. The divider system of claim 13, further comprising:
a controller;
a drive mechanism in communication with the controller;
wherein the drive mechanism is actuable by the controller to:
rotate the screw set at a rotation speed; and
drive the first and second belts at a conveyor speed; and
wherein controller is operable to control the rotation speed and the conveyor speed such that a first conveying force imposed by the respective first and second screws on the respective first and second series of objects is in equilibrium with a second conveying force imposed by the respective first and second belts on the respective first and second series of objects.

15. The divider system of claim 13, wherein
wherein each of the first and second screws defines a respective thread form and is rotatable on a respective screw axis to define a longitudinal axis therebetween; and
wherein the thread forms of the first and second screws are mirror images relative to the longitudinal axis during rotation of the screw set.

16. The divider system of claim 13, wherein
a diverting mechanism comprising a first diverter; and
wherein the first diverter is selectively actuable to divert objects from the first screw to the second screw.

17. A method of dividing a sequence of objects into a first series of objects and a second series of objects, the method comprising:
providing:
a first screw;
a second screw;
a screw set including a first screw and a second screw;
wherein the first and second screws are rotatably mounted to define a channel therebetween;
receiving a sequence of objects via the channel such that objects of the sequence are divided into a first series of objects and a second series of objects;
receiving the first series of objects to the first screw;
receiving the second series of objects to the second screw;
providing a diverting mechanism including a diverter;
selectively actuating the diverter to divert objects from the first screw to the second screw.

18. The method of claim 17, wherein the diverter includes a pivot arm selectively pivotable between a first position and a second position;
the method further comprising:
selectively pivoting the pivot arm from the first position to the second position to divert objects from the first screw to the second screw.

19. The method of claim 17, further comprising:
providing a sensor operable to sense an object condition of at least one object of the sequence of objects;
sensing, via the sensor, the object condition;
outputting to a controller, via the sensor, a condition signal;
wherein the condition signal is indicative of the object condition; and
selectively actuating the diverting mechanism, via the controller, in response to the condition signal.

20. The method of claim 17, wherein a longitudinal axis is defined by the channel, the method further comprising:
providing a first belt extending longitudinally along the channel and adjacent the first screw, wherein the first belt is tilted at a first tilt angle relative to the longitudinal axis;

tilting objects received by the first screw on the first belt toward the first screw;
conveying along the channel, via the first belt and the first screw, the objects received by the first screw;
providing a second belt extending longitudinally along the channel and adjacent the second screw, wherein the second belt is tilted at a second tilt angle relative to the longitudinal axis;
tilting objects received by the second screw on the second belt toward the second screw; and
conveying along the channel, via the second belt and the second screw, the objects received by the second screw.

\* \* \* \* \*